US008050856B2

(12) United States Patent
Duty et al.

(10) Patent No.: US 8,050,856 B2
(45) Date of Patent: Nov. 1, 2011

(54) METHODS AND SYSTEMS FOR POWERTRAIN OPTIMIZATION AND IMPROVED FUEL ECONOMY

(75) Inventors: Mark J. Duty, Goodrich, MI (US); Melody Papke, Royal Oak, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 376 days.

(21) Appl. No.: 11/736,613

(22) Filed: Apr. 18, 2007

(65) Prior Publication Data
US 2008/0262712 A1 Oct. 23, 2008

(51) Int. Cl.
*G06F 19/00* (2011.01)
*G06G 7/70* (2006.01)
*G06G 7/76* (2006.01)

(52) U.S. Cl. .............. 701/123; 701/65; 701/99; 477/43; 180/338

(58) Field of Classification Search ................. 701/123, 701/124, 99, 54, 65; 477/901, 43; 180/338
See application file for complete search history.

(56) References Cited

U.S. PATENT DOCUMENTS

| | | | | | |
|---|---|---|---|---|---|
| 4,327,578 | A | * | 5/1982 | D'Angelo | 73/116.06 |
| 5,547,438 | A | * | 8/1996 | Nozaki et al. | 477/169 |
| 6,199,001 | B1 | * | 3/2001 | Ohta et al. | 701/51 |
| 7,107,829 | B2 | * | 9/2006 | Tachiki | 73/115.01 |
| 7,239,945 | B2 | * | 7/2007 | Hiemer et al. | 701/29 |
| 7,421,325 | B2 | * | 9/2008 | Geist et al. | 701/51 |
| 7,469,177 | B2 | * | 12/2008 | Samad et al. | 701/54 |
| 7,660,710 | B2 | * | 2/2010 | Sirrine | 703/8 |
| 2003/0216847 | A1 | * | 11/2003 | Bellinger | 701/51 |
| 2006/0014608 | A1 | * | 1/2006 | Mitchell et al. | 477/107 |
| 2007/0112475 | A1 | * | 5/2007 | Koebler et al. | 701/1 |
| 2007/0199745 | A1 | * | 8/2007 | Hayashi | 180/65.2 |
| 2009/0043467 | A1 | * | 2/2009 | Filev et al. | 701/57 |

OTHER PUBLICATIONS

Phillips, PC based vehicle powertrain simulation.*
Rubin, powertrain system dynamic models.*
Assanis, D., Z. Filipi, S. Gravante, S. Grohnke, X. Gui, L. Louca, G. Rideout, J. Stein, and Y. Wang (2000). "Validation and Use of SIMULINK Integrated, High Fidelity, Engine-In-Vehicle Simulation of the International Class VI Truck," *SAE Paper 2000-01-0288*.
Auiler, J.E., J.D. Zbrozek, and P.N. Blumberg, (1977). "Optimization of Automotive Engine Calibration for Better Fuel Economy—Methods and Applications," *SAE Paper 770076*.

(Continued)

*Primary Examiner* — Jack Keith
*Assistant Examiner* — Rami Khatib
(74) *Attorney, Agent, or Firm* — Ralph E. Smith

(57) ABSTRACT

The technology described herein provides methods and systems for powertrain optimization and improved fuel economy including multiple displacement engine modeling and control optimization, automotive powertrain matching for fuel economy, cycle-based automotive shift and lock-up scheduling for fuel economy, and engine performance requirements based on vehicle attributes and drive cycle characteristics. Also provided is a reverse tractive road load demand simulation algorithm used to propagate a reverse tractive road load demand and a corresponding component torque and speed, derived from a vehicle speed trace, in a reverse direction through a powertrain system. Also provided is a dynamic optimization algorithm. The dynamic programming algorithm is applied to a matrix of fuel flow rates to find the optimal control path that maximizes the powertrain efficiency over a cycle.

25 Claims, 13 Drawing Sheets

OTHER PUBLICATIONS

Bellman, R. (1972). *Dynamic Programming*, 6$^{th}$ Ed. Princeton University Press, New Jersey.

Berry, A., M. Blissett, J. Steiber, A. Tobin, and S. McBroom (2002). "A New Approach to Improving Fuel Economy and Performance Prediction through Coupled Thermal Systems Simulation," *SAE Paper 2002-01-1208*.

Blumberg, P.N. (1976) "Powertrain Simulation: A Tool for the Design and Evaluation of Engine Control Strategies in Vehicles," *SAE Paper 760158*.

Denardo, E.V. (1982). *Dynamic Programming: Models and Applications*, Prentice-Hall, New Jersey.

Kim, D. (2006). "Math-Model Based Gear-Shift Control Strategy for Advanced Vehicle Powertrain Systems," *University of Michigan Ph.D. Dissertation*.

Lin C.C., H. Peng, J.W. Grizzle, and J.M. Kang (2003) "Power management strategy for a parallel hybrid electric truck," *IEEE Transactions on Control Systems Technology*, 11, 839-849.

Markel, T., A. Brooker, T. Hendricks, V. Johnson, V., K. Kelly, B. Kramer, M. O'Keefe, S. Sprik, and K. Wipke (2002). "ADVISOR: A Systems Analysis Tool for Advanced Vehicle Modeling," *Journal of Power Sources*, 110, 255-266.

Porter, F.C. (1979) "Design for Fuel Economy—The New GM Front Drive Cars," *SAE Paper 790721*.

Rousseau, A., S. Pagerit, G. Monnet, and A. Feng (2001). "The New PNGV System Analysis Toolkit PSAT v4.1—Evolution and Improvement," *SAE Paper 2001-01-2536*.

Wong, L.T. and W.J. Clemens (1979). "Powertrain Matching for Better Fuel Economy" *SAE Paper 790045*.

\* cited by examiner

METHODS AND SYSTEMS FOR POWERTRAIN OPTIMIZATION AND IMPROVED FUEL ECONOMY

FIELD OF THE INVENTION

The technology described herein relates generally to methods and systems for powertrain optimization and improved fuel economy. More specifically, the technology described herein relates to methods and systems for multiple displacement engine modeling and control optimization, automotive powertrain matching for fuel economy, cycle-based automotive shift and lock-up scheduling for fuel economy, and engine performance requirements based on vehicle attributes and drive cycle characteristics.

BACKGROUND OF THE INVENTION

Optimal powertrain integration and control design are essential to developing more fuel efficient vehicles. Vehicle systems are becoming increasingly complex, as are driver expectations for both fuel economy and performance. Shorter product development times result in less time available to evaluate alternative powertrain hardware configurations and related control strategies. Often, the interrelationship between hardware and control design and the dependence on driver application of each is overlooked.

Simulation and optimization of vehicle systems are now being utilized more as vehicle systems become increasingly complex and as available product development time decreases. Known in the art are various methods and systems for powertrain optimization and improved fuel economy. These methods and systems, however, rely heavily on control parameters, such as a shift map, which may not exist for hypothetical vehicle designs. Additionally, such methods and systems do not take the driving style or drive cycle characteristics into account. Known methods and systems also do not have the ability to optimize hardware and control design simultaneously.

Vehicle system simulations known in the art employ either a forward or backward-looking approach. A forward-looking simulation includes a driver model and iteratively alters vehicle subsystem and component commands until the desired response of the system is achieved. The driver model considers the current and required speed to determine the appropriate throttle and brake commands often using a PI controller (proportional (P) and integral (I) controls). The throttle command is translated into a fuel flow rate and engine torque, which is subsequently inputted into the transmission model, where the transmission output torque is computed from the transmission's efficiency and gear ratio. The transmission output torque is propagated forward through the drivetrain until the tractive force at the road and corresponding acceleration is calculated.

Backward-looking models generally assume the vehicle meets the desired driver trace and therefore do not require a driver model. Contrary to the forward-looking approach, the force required to achieve the corresponding acceleration is directly calculated step-by-step from the desired speed trace. The required force is then converted into the required torque and rotational speed that must be provided by the component directly upstream. This calculation approach is continued in the reverse direction of the road load tractive force through the drivetrain until the energy demand that would be necessary to meet the driver trace is determined.

Advanced vehicle models have become an essential tool to evaluate vehicle system performance early in the design phase. The National Renewable Energy Laboratory developed the Advanced Vehicle Simulator (ADVISOR), a backward-looking model, to quantify the fuel economy, performance and emissions of vehicles including alternative technologies (Markel, T., A, Brooker, T. Hendricks, V. Johnson, V., K. Kelly, B. Kramer, M. O'Keefe, S. Sprik, and K. Wipke (2002). "ADVISOR, A Systems Analysis Tool for Advanced Vehicle Modeling," *Journal of Power Sources*, 110, 255-266.). Argonne National Laboratory under the direction of the Partnership for a New Generation (PGNV) developed the Vehicle Systems Analysis Toolkit (P-SAT), a forward-looking simulation that calculates the power generated by the powertrain by modeling the driver following a pre-defined cycle (Rousseau, A., S. Pagerit, G. Monnet, and A. Feng (2001). "The New PNGV System Analysis Toolkit PSAT v4.1—Evolution and Improvement," *SAE Paper* 2001-01-2536.). The Automotive Research Center at the University of Michigan developed a Vehicle Engine Simulation (VESIM) composed of forward-looking engine, driveline, and vehicle dynamics modules to simulate the dynamic response of a heavy duty diesel truck (Assam's, D., Z. Filipi, S. Gravante, S. Grohnke, X. Gui, L. Louca, G, Rideout, J. Stein, and Y. Wang (2000). "Validation and Use of SIMULINK Integrated, High Fidelity, Engine-In-Vehicle Simulation of the International Class VI Truck," *SAE Paper* 2000-01-0288.). An array of other modeling software and tools has been developed both commercially and in academia. One example is the Rapid Automotive Performance Simulator (RAPTOR) co-developed by Southwest Research Institute and DaimlerChrysler used for virtual powertrain fuel economy predictions (Berry, A., M. Blissett, J. Steiber, A. Tobin, and S. McBroom (2002). "A New Approach to Improving Fuel Economy and Performance Prediction through Coupled Thermal Systems Simulation," *SAE Paper* 2002-01-1208).

Early vehicle design optimization work concentrated on optimizing engine control parameters. Auiler et al used a reverse power flow model to optimize the air/fuel ratio, spark timing, and percentage of exhaust gas recirculation in the engine calibration using dynamic programming to allocate emissions contributions while maximizing fuel economy (Auiler, J. E., J. D. Zbrozek, and P. N. Blumberg, (1977). "Optimization of Automotive Engine Calibration for Better Fuel Economy—Methods and Applications," *SAE Paper* 770076.). Initial work involving powertrain matching techniques for improving fuel economy was performed by Wong and Clemens (Wong, L. T. and W. J. Clemens (1979). "Powertrain Matching for Better Fuel Economy" *SAE Paper* 790045.) and Porter (Porter, F. C. (1979) "Design for Fuel Economy—The New GM Front Drive Cars," *SAE Paper* 790721.). Dynamic programming was later applied to find the optimal gear shift sequence and the power split for a hybrid electrical truck (Lin C. C., H. Peng, J. W. Grizzle, and J. M. Kang (2003) "Power Management Strategy for a Parallel Hybrid Electric Truck," *IEEE Transactions on Control Systems Technology*, 11, 839-849.). Kim used a forward-looking model and dynamic programming to optimize shift maps for fuel economy based on constant throttle inputs (Kim, D. (2006), "Math-Model Based Gear-Shift Control Strategy for Advanced Vehicle Powertrain Systems," *University of Michigan Ph.D. Dissertation*.).

While optimization in vehicle system design is growing, there still exists a need to fully explore the capabilities of the powertrain system by developing a model-based approach that combines optimal powertrain hardware configuration with optimal control. The technology described herein, including, for example, matching the powertrain hardware configuration and the transmission gear shift and torque converter clutch control strategies to specific vehicle and drive cycle attributes, provides such a solution.

BRIEF SUMMARY OF THE INVENTION

A reverse tractive road load demand model, dynamic optimization methodology, and simulation tool are disclosed herein to address the challenge of matching the powertrain hardware and control strategy to specific vehicle attributes and driver applications for improved overall vehicle system efficiency. The reverse dynamic optimization methodology is used to assess engine cylinder deactivation, transmission shift and torque converter lock-up control strategies, evaluate alternative powertrain hardware configurations, and establish design criteria.

In one exemplary embodiment, the technology described herein provides a method for powertrain optimization and improved fuel economy in a vehicle. The method includes utilizing a reverse tractive road load demand simulation algorithm, operative to propagate a reverse tractive road load demand and a corresponding component torque and speed, the corresponding component torque and speed derived from a vehicle speed trace, in a reverse direction through a powertrain system, calculating a required torque and speed from the vehicle speed trace; propagating the required torque and speed backwardly though the powertrain system to a vehicle engine, and controlling the vehicle engine and improving the fuel economy with the determined required engine torque and speed.

The powertrain system includes each of wheels, axle, driveshaft, transfer ease, transmission, torque converter, and engine vehicle subsystems. The method further includes utilizing the reverse tractive road load demand simulation algorithm with a direction of power transfer flowing from the wheels, to the axle, to the driveshaft, to the transfer case, to the transmission, to the torque converter, and to the engine vehicle subsystem.

The method farther includes utilizing the reverse tractive road load demand simulation algorithm to simulate the required engine torque as a function of engine speed based on a plurality of vehicle attributes by propagating the required torque and speed from the vehicle wheels through fee powertrain for all possible component states and utilizing the required engine torque to traverse different drive cycles as part throttle engine torque design requirements.

The method further includes utilizing a dynamic optimization algorithm to calculate required fuel flow for each of a plurality of powertrain component control decisions, identify an optimal state for each of the plurality of powertrain components, and control each of the plurality of powertrain components in the identified optimal state for each in order to improve fuel efficiency.

The method further includes calculating a required fuel flow for each of a plurality of control decisions for each of a plurality of powertrain states at k=N−1, identifying a minimum required fuel flow and an optimal control decision for each of the plurality of powertrain states at k=N−1, calculating recursively a required fuel flow for each of a plurality of control decisions for each of a plurality of powertrain states for $0 \leq k < N-1$, identifying a minimum required fuel flow and an optimal control decision for each of a plurality of powertrain states for $0 \leq k < N-1$, determining a global optimum accumulated required fuel flow and initial powertrain state at k=0, and creating an optimal state vector by sequencing the optimal control decision at each time step for $0 \leq k \leq N-1$, wherein k is a time step and N is a cycle duration.

The method further includes utilizing the reverse tractive road load demand simulation algorithm to optimize cycle-based automotive shift and lock-up scheduling for improved fuel economy; determining required fuel flow for all possible states within hardware constraints, determining a cycle-based automotive shift and lock-up schedule for improved fuel economy, applying the dynamic optimization algorithm to find an optimal control path that minimizes accumulated fuel flow, and controlling a vehicle powertrain subsystem with the optimal control path to minimize the accumulated fuel flow.

The method further includes utilizing the reverse tractive road load demand simulation algorithm to optimize a multiple displacement engine over a plurality of different drive cycles, determining if there is enough torque available in a multiple displacement mode, utilizing the dynamic optimization algorithm to find an optimal control path yielding a minimal accumulated fuel flow and an optimal control policy, and controlling a vehicle powertrain subsystem with the optimal control path to yield minimal accumulated fuel flow and optimal control policy.

The method further includes utilizing the reverse tractive road load demand simulation algorithm to determine a required fuel flow for all possible states within hardware constraints, determining the required fuel flow for all possible states within hardware constraints, utilizing the dynamic optimization algorithm to find an optimal control for a one or more powertrain component, and iteratively calculating an optimal combination of powertrain components that performs well based on a desired cycle of interest.

The method further includes the reverse tractive road load demand simulation algorithm further including, utilizing the following relationship:

$$F = A + Bv + Cv^2 + m\frac{dv}{dt} + mg\sin\theta$$

wherein A, B, and C are the road load coefficients, V is the vehicle speed, m is the vehicle mass, g is gravity, and θ is the angle the road makes with the horizontal.

The method further includes the dynamic optimization algorithm utilizing the following relationship for determining a total cost to be minimized:

$$J = g_N(x_N) + \sum_{k=0}^{N-1} L_k(x_k, u_k)$$

wherein $g_N$ is the cost at time step N, $L_k$ is the instantaneous transition cost at time step k, and the system is modeled as a discrete time non-linear system of the form:

$$x_{k+1} = f_k(x_k, u_k), k=0,1,\ldots,N-1$$

wherein $x_k$ defines the state of the system and $u_k$ defines the control variables to be selected at time k.

In another exemplary embodiment, the technology described herein includes a control system for powertrain optimization and improved fuel economy in a vehicle. The control system includes: a powertrain system, and a reverse tractive road load demand simulation algorithm in operative communication with the powertrain system, operative to propagate a reverse tractive road load demand and a corresponding component torque and speed, the corresponding component torque and speed derived from a vehicle speed trace in a reverse direction through the powertrain system. The control system comprises logic configured to: calculate a required torque and speed from the vehicle speed trace, propagate the required torque and speed backwardly though the powertrain system to a vehicle engine, and control the vehicle engine and improve the fuel economy with the determined required engine torque and speed.

The control system further includes a powertrain system including each of wheels, axle, driveshaft, transfer case, transmission, torque converter, and engine vehicle subsystems, and logic configured to utilize the reverse tractive road load demand simulation algorithm with a direction of power transfer flowing from the wheel, to the axle, to the driveshaft, to the transfer case, to the transmission, to the torque converter, and to the engine vehicle subsystem.

The control system further includes logic configured to: utilize the reverse tractive road load demand simulation algorithm to simulate the required engine torque as a function of engine speed based on a plurality of vehicle attributes, propagate the required torque and speed from the vehicle wheels through the powertrain for all possible component states, utilize the required engine torque to traverse different drive cycles as part throttle engine torque requirements.

The control system further includes logic configured to: utilize a dynamic optimization algorithm to calculate required fuel flow for each of a plurality of powertrain component control decisions, identify an optimal state for each of the plurality of powertrain components, and control each of the plurality of powertrain components in the identified optimal state for each in order to improve fuel efficiency.

The control system further includes logic configured to calculate a required fuel flow for each of a plurality of control decisions for each of a plurality of powertrain states at k=N−1, identify a minimum required fuel flow and an optimal control decision for each of the plurality of powertrain states at k=N−1, calculate recursively a required fuel flow for each of a plurality of control decisions for each of a plurality of powertrain-states for $0 \leq k < N-1$, identify a minimum required fuel flow and an optimal control decision for each of a plurality of powertrain states for $0 \leq k < N-1$, determine a global optimum accumulated required fuel flow and initial powertrain state at k=0, and create an optimal state vector by sequencing the optimal control decision at each time step for $0 \leq k \leq N-1$, wherein k is a time step and N is a cycle duration.

The control system further includes logic configured to utilize the reverse tractive road load demand simulation algorithm to optimize cycle-based automotive shift and lock-up scheduling for improved fuel economy, determine required fuel flow for all possible states within hardware constraints, determine a cycle-based automotive shift and lock-up schedule for improved fuel economy, apply the dynamic optimization algorithm to find an optimal control path that minimizes accumulated fuel flow; and control a vehicle powertrain subsystem with the optimal control path to minimize the accumulated fuel flow.

The control system further includes logic configured to utilize the reverse tractive road load demand simulation algorithm to optimize a multiple displacement engine over a plurality of different drive cycles, determine if there is enough torque available in a multiple displacement mode, utilize the dynamic optimization algorithm to find an optimal control path yielding a minimal accumulated fuel flow and an optimal control policy, and control a vehicle powertrain subsystem with the optimal control path to yield minimal accumulated fuel flow and optimal control policy.

The control system further includes logic configured to utilize the reverse tractive road load demand simulation algorithm to determine a required fuel flow for all possible states within hardware constraints, determine the required fuel flow for all possible states within hardware constraints, utilize the dynamic optimization algorithm to find an optimal control for one or more powertrain components, and iteratively calculate an optimal combination of powertrain components that performs well based on a desired cycle of interest.

The control system further includes logic configured to utilize the following relationship:

$$F + A + Bv + Cv^2 + m\frac{dv}{dt} + mg\sin\theta$$

wherein A, B, and C are the road load coefficients, v is the vehicle speed, m is the vehicle mass, g is gravity, and θ is the angle the road makes with the horizontal.

The control system further includes logic configured to, utilize the following relationship for determining a total cost to be minimized:

$$J = g_N(x_N) + \sum_{k=0}^{N-1} L_k(x_k, u_k)$$

wherein $g_N$ is the cost at time step N, $L_k$ is the instantaneous transition cost at time step k, and the system is modeled as a discrete time non-linear system of the form:

$$x_{k+1} = f_k(x_k, u_k), k=0,1,\ldots,N-1$$

wherein $x_k$ defines the state of the system and $u_k$ defines the control variables to be selected at time k.

In yet another exemplary embodiment, the technology described herein includes a computer readable medium encoded with programming for powertrain optimization and improved fuel economy in a vehicle, the programming configured to utilize a reverse tractive road load demand simulation algorithm, propagate a reverse tractive road load demand and a corresponding component torque and speed, the corresponding component torque and speed derived from a vehicle speed trace in a reverse direction through a powertrain system, calculate a required torque and speed from the vehicle speed trace, propagate the required torque and speed backwardly though the powertrain system to a vehicle engine, and control the vehicle engine and improve the fuel economy with the determined required engine torque and speed.

The computer readable medium encoded with programming further includes a powertrain system that includes each of a wheel, axle, driveshaft, transfer case, transmission, torque converter, and engine vehicle subsystem, and programming configured to, utilize the reverse tractive road load demand simulation algorithm with a direction of power transfer flowing from the wheel, to the axle, to the driveshaft, to the transfer case, to the transmission, to the torque converter, and to the engine vehicle subsystem.

The computer readable medium encoded with programming further includes programming configured to utilize the reverse tractive road load demand simulation algorithm to simulate the required engine torque as a function of engine speed based on a plurality of vehicle attributes by propagating the required torque and speed from the vehicle wheels through the powertrain for all possible component states and utilizing the required engine torque to traverse different drive cycles as part throttle engine torque design requirements.

The computer readable medium encoded with programming further includes programming configured to utilize a dynamic optimization algorithm to calculate required fuel flow for each of a plurality of powertrain component control decisions, identify an optimal state for each of the plurality of powertrain components, and control each of the plurality of powertrain components in the identified optimal state for each in order to improve fuel efficiency.

The computer readable medium encoded with programming further includes programming configured to calculate a required fuel flow for each of a plurality of control decisions for each of a plurality of powertrain states at k=N−1, identify a minimum required fuel flow and an optimal control decision for each of the plurality of powertrain states at k=N−1, calculate recursively a required fuel flow for each of a plurality of control decisions for each of a plurality of powertrain states for 0≦k<N−1, identify a minimum required fuel flow and an optimal control decision for each of a plurality of powertrain states for 0≦k<N−1, determine a global optimum accumulated required fuel flow and initial powertrain state at k=0, and create an optimal state vector by sequencing the optimal control decision at each time step for 0≦k≦N−1, wherein k is a time step and N is a cycle duration.

The computer readable medium encoded with programming further includes programming configured to utilize the reverse tractive road load demand simulation algorithm to optimize cycle-based automotive shift and lock-up scheduling for improved fuel economy, determine required fuel flow for all possible states within hardware constraints, determine a cycle-based automotive shift and lock-up schedule for improved fuel economy, apply the dynamic optimization algorithm to find an optimal control path that minimizes accumulated fuel flow, and control a vehicle powertrain subsystem with the optimal control path to minimize the accumulated fuel flow.

The computer readable medium encoded with programming further includes programming configured to utilize the reverse tractive road load demand simulation algorithm to optimize a multiple displacement engine over a plurality of different drive cycles, determine if there is enough torque available in a multiple displacement mode, utilize the dynamic optimization algorithm to find an optimal control path yielding a minimal accumulated fuel flow and an optimal control policy, and control a vehicle powertrain subsystem with the optimal control path to yield minimal accumulated fuel flow and optimal control policy.

The computer readable medium encoded with programming further includes programming configured to utilize the reverse tractive road load demand simulation algorithm to determine a required fuel flow for all possible states within hardware constraints, determine the required fuel flow for all possible states within hardware constraints, utilize the dynamic optimization algorithm to find an optimal control for a one or more powertrain component; and iteratively calculate an optimal combination of powertrain components that performs well based on a desired cycle of interest.

The computer readable medium encoded with programming further includes programming configured to utilize the following relationship;

$$F + A + Bv + Cv^2 + m\frac{dv}{dt} + mg\sin\theta$$

wherein A, B, and C are the road load coefficients, v is the vehicle speed, m is the vehicle mass, g is gravity, and θ is the angle the road makes with the horizontal.

The computer readable medium encoded with programming further includes programming configured to utilize the following relationship for determining a total cost to be minimized:

$$J = g_N(x_N) + \sum_{k=0}^{N-1} L_k(x_k, u_k)$$

wherein $g_N$ is the cost at time step N, $L_k$ is the instantaneous transition cost at time step k, and the system is modeled as a discrete time non-linear system of the form:

$$x_{k+1}=f_k(x_k,u_k), k=0,1,\ldots, N-1$$

wherein $x_k$ defines the state of the system and $u_k$ defines the control variables to be selected at time k.

BRIEF DESCRIPTION OF THE DRAWINGS

The present invention is illustrated and described herein with reference to the various drawings, in which like reference numbers denote like method steps and/or system components, respectively, and in which.

Figure 1:
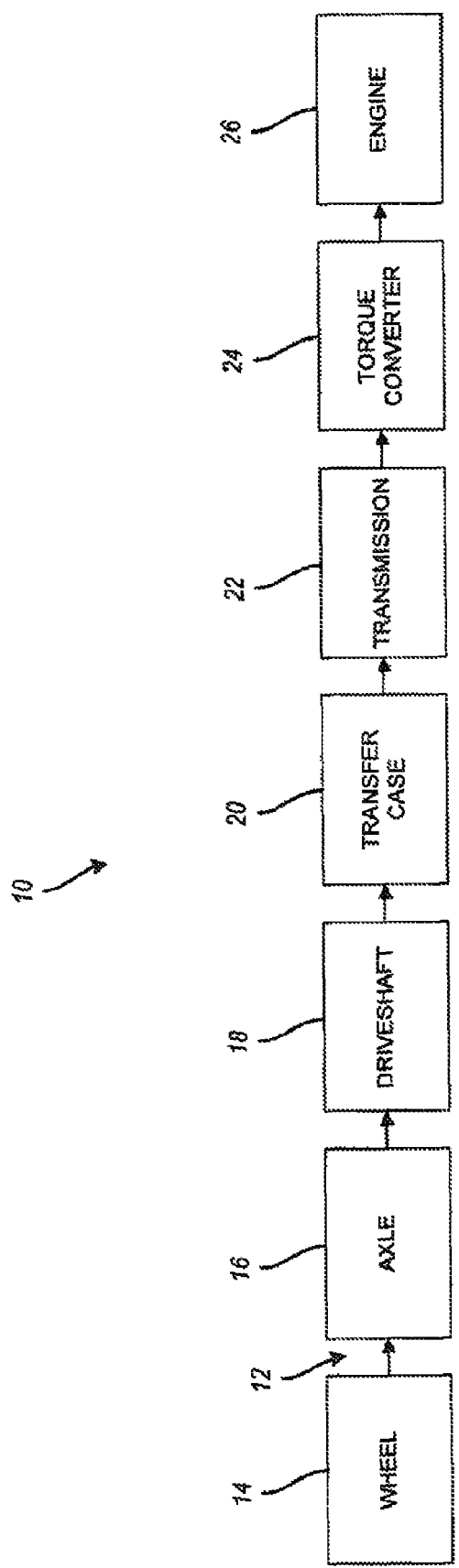
FIG. 1 is a schematic diagram illustrating the vehicle subsystems modeled with the reverse tractive road load demand model and the direction of power flow, the vehicle systems modeled including the wheel, axle, driveshaft, transfer case, transmission, torque converter, and engine.

Advantageously, the methods and systems for powertrain optimization and improved fuel economy overcome many of the deficiencies known in the art pertaining to powertrain optimization and improved fuel economy. The technology described provides a control strategy that is catered to specific vehicle attributes and powertrain system configuration, while incorporating the entire powertrain into the design requirements and allowing all hardware options to be evaluated in their optimal conditions. The technology described also facilitates the investigation of how various powertrain configurations and control strategies influence the fuel economy for different drive cycles. Additionally, the technology described also provides that trade off in fuel economy and acceleration performance over multiple drive cycles is incorporated into implementable shift and lock-up schedules with weighting factors. In regard to multiple displacement engine modeling, this technology advantageously provides the elimination of the manual testing normally required to optimize multiple displacement operation. Fuel economy over different drive cycles is evaluated in conjunction with a multiple displacement system (MDS). The technology described also incorporates optimal shift and torque converter clutch control simultaneously with MDS operation. Additionally, the technology described also provides the selection of solutions that meet vehicle objectives without requiring hardware implementation and empirical fuel economy testing, which, if used, would create variability. Furthermore, the technology described also provides a reduced development time by facilitating virtual design and evaluating benefits virtually.

There has thus been outlined, rather broadly, the features of the present invention in order that the detailed description that follows may be better understood, and in order that the present contribution to the art may be better appreciated. There are additional features of the invention that will be described and which will form the subject matter of the claims. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Additional aspects and advantages of the technology described herein will be apparent from the following detailed description of an exemplary embodiment which is illustrated in the accompanying drawings.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

DETAILED DESCRIPTION OF THE INVENTION

Before describing the disclosed embodiments of the present invention in detail, it is to be understood that the invention is not limited in its application to the details of the particular arrangement shown here since the invention is capable of other embodiments. Also, the terminology used herein is for the purpose of description and not of limitation.

In various exemplary embodiments, the technology described herein provides a reverse tractive road load demand model, dynamic optimization methodology, and Matlab®/Simulink® based tool to address the challenge of matching the powertrain hardware and control strategy to specific vehicle attributes and driver applications for improved overall vehicle system efficiency. The reverse dynamic optimization methodology is used to assess and optimize engine cylinder deactivation, transmission gear shift, and torque converter lock-up control strategies; evaluate alternative powertrain hardware configurations; and establish design criteria.

The reverse dynamic optimization approach combines a backward-looking model that simulates the powertrain in every possible state with a dynamic programming algorithm that finds the optimal control strategy. The reverse model is quasi-static, derivative-based with inverted causality in that the road load force and corresponding wheel torque to achieve the acceleration is iteratively calculated from the vehicle speed trace. The road load force is modeled as a function of speed using the 3-term road load coefficients described in Society of Automotive Engineers (SAE) standard J 2263. The total required tractive propulsion load is derived from the 3-term road load, vehicle inertia, and road grade forces.

The reverse tractive road load demand model is represented by the following relationship:

$$F = A + Bv + Cv^2 + m\frac{dv}{dt} + mg\sin\theta$$

wherein A, B, and C are the road load coefficients, v is the vehicle speed, m is the vehicle mass, g is gravity, and $\theta$ is the angle the road makes with the horizontal.

The required torque and speed are then propagated through the powertrain system to the engine where the fuel flow is determined for all of the possible transmission gear and torque converter states within the hardware constraints of the system.

Referring now to FIG. 1, the vehicle subsystems modeled 10 and the direction of power flow 12 are shown. The wheel 14, axle 16, driveshaft 18, transfer case 20, transmission 22, torque converter 24, and engine 26 vehicle subsystems are shown.

Driveline inefficiencies, parasitic losses, accessory loads, and rotating component inertial losses, as a function of speed and load, are also accounted for during the power transfer calculations from component to component.

The shift schedule and torque converter clutch control strategies both have a significant effect on the efficiency and overall fuel economy of the powertrain system. Once the propagated torque required to meet the required tractive road load demand reaches the transmission, the control strategy is treated as a multi-stage, multi-dimension decision process. In a stepped transmission, a number of gear ratios may meet the road load demand at the prescribed transmission output speed; and the challenge is determining which gear operates the engine at the lowest fuel flow with acceptable drivability. Furthermore, automatic transmissions are typically equipped with torque converters and clutches that can be controlled to operate in an open, fully-locked, or controlled slip state, which also has a considerable impact on the overall system efficiency.

Since the intention is to obtain a powertrain control strategy that minimizes the total fuel flow, $m_f$, the objective function is:

$$J = \sum_{k=0}^{N-1} \dot{m}_f(k) \to \min$$

wherein N is the drive cycle duration and k is the time step. The objective function is subject to the following engine speed, $N_e$, constraints to ensure safe operation of the engine;

$$N_{e,min} < N_{e,k} < N_{e,max}$$

Additional constraints are imposed to ensure that the engine torque, $\tau_e$, meets the torque and speed requirements of vehicle speed trace. The transmission output speed, $N_o$, in revolutions per minute should meet the vehicle speed, v, requirements in miles per hour:

$$N_{o,k} = \frac{1}{60} v \cdot R_a \cdot r_r$$

$$\tau_{e,k}(N_{e,k}) > \tau_{e-required,k}(N_{e,k})$$

wherein Ra is the final drive or axle ratio and $r_r$ is the tire size in revolutions per mile.

To overcome one shortfall of the backward-looking modeling approach, a penalty is added to states where the engine torque required exceeds the engine torque available at the corresponding engine speed. This guarantees that the drivetrain is always in a suitable gear and lock-up state that is capable of meeting the acceleration of the vehicle speed trace.

$$\tau_{e,min}(N_{e,k}) < \tau_{e,k} < \tau_{e,max}(N_{e,k})$$

Gear shift scheduling is modeled as a discrete time dynamic system, where the gear state, $G_{x,k}$, is the gear number and the shift is constrained by mechanical limitations of the stepped transmission, such as shift-values of −1, 0, 1 for down-shift, no shift and up-shift.

When the torque converter is in the open state, the impeller speed and torque are influenced by the design characteristics of the torque converter. The torque converter is characterized in the model by dynamometer data including, its corresponding torque ratio, efficiency, and capacity or K-factor curve, where K-factor is defined by:

$$K = \frac{N_e}{\sqrt{\tau_e}}$$

and:

$$K = f\left(\frac{N_t}{N_e}\right)$$

Figure 2:
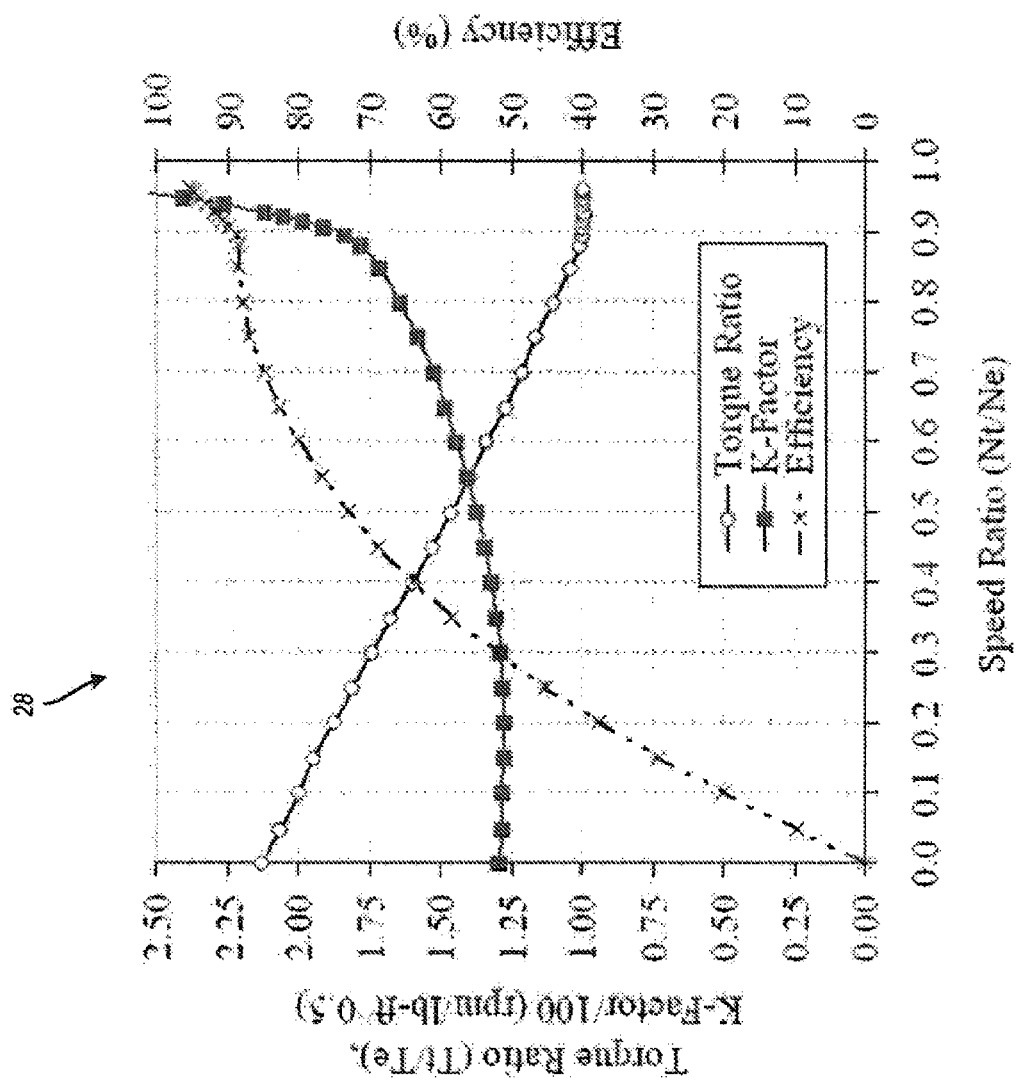
FIG. 2 is a schematic diagram illustrating the typical characteristics of a torque converter.

Referring now to FIG. 2, a chart 28 illustrating the typical characteristics of a torque converter is shown. The chart 28 illustrates the parameters used to describe the characteristics of a torque converter.

Due to the model's reverse approach, the causality of torque converter K-factor relationship needs to be inverted and a similar K-factor relationship for the torque converter turbine is derived:

$$K_t = \frac{N_t}{\sqrt{\tau_t}}$$

where $N_t$ is the turbine speed and $r_t$ is the turbine torque (Blumberg, P. N. (1976) "Powertrain Simulation: A Tool for the Design and Evaluation of Engine Control Strategies in Vehicles," *SAE Paper* 760158.).

When the torque converter clutch is fully engaged, the torque converter's input and output shafts are locked, effectively eliminating any power loss yet losing any of the converter torque multiplication at low speed ratios. In the locked state the engine torque is limited to the torque available at the required turbine speed, which may be insufficient to meet the torque requirements of the vehicle speed profile. Also during the locked state, noise, vibration and harshness (NVH) due to torque fluctuations produced by engine combustion are transmitted directly through the driveline which adds another constraint to enabling lock-up at low turbine speed conditions. For regions where torque fluctuation does not allow for full lock-up, electronically modulated control can be applied to the torque converter clutch to allow for some slippage which incurs some power loss but no transmittal of torque fluctuations. Clutch control enable mode is constrained by the minimum turbine speed to enable lock-up (LU) or partial lock-up (PL), usually determined by NVH characteristics.

Discrete deterministic dynamic programming (DP) is applied as a model-based system design tool to find the control strategy that maximizes the powertrain efficiency over a desired drive cycle. Dynamic programming is based on Bellman's Principle of Optimality and suggests that an optimal policy can be constructed in an iterative fashion by first solving the sub-problem at the last time step, N, then gradually extending the problem to include the last two time steps, and continuing in this fashion until the optimal policy for the entire problem is determined (Bellman, R. (1972). *Dynamic Programming*, 6$^{th}$ Ed. Princeton University Press, New Jersey.; Denardo, E. V. (1982). *Dynamic Programming: Models and Applications*, Prentice-Hall, New Jersey.). The advantage of dynamic programming is that the optimal system state at a given time step is not viewed in isolation since control decisions will be ranked against the sum of the present costs and future costs, where the cost is the required fuel flow to meet the tractive road load demand. The cost function is additive in the sense that the cost incurred at time, k, accumulates over time. The total cost to be minimized is:

$$J = g_N(x_N) + \sum_{k=0}^{N-1} L_k(x_k, u_k)$$

where $g_N$ is the cost at time step N, $L_k$ is the instantaneous transition cost at time step k, and the system is modeled as a discrete time non-linear system of the form:

$$x_{k+1} = f_k(x_k, u_k), k=0, 1, \ldots, N-1$$

where $x_k$ defines the state of the system and $u_k$ defines the control variables to be selected at time k.

The state and control variables are stored in discrete grids and the optimal global solution is determined by solving for the minimum cost recursively. The first step is to determine the minimum cost to go, J*, from state, $x_{N-1}$, at time step, N−1:

$$J^*_{N-1}(x_{N-1}) = \min_{u(N-1)} [g_N(x_N) + L(x_{N-1}, u_{N-1})]$$

given the instantaneous transition cost, L, for each decision, u, and continuing backwards in time for $0 \leq k < N-1$;

$$J^*_k(x_k) = \min_{u(k)} [J^*(x_{k+1}) + L(x_k, u_k)]$$

until the first step is reached and the optimal path and minimum accumulated cost for the entire cycle duration is determined.

The reverse dynamic optimization methodology and Matlab®/Simulink® based tool was developed to quickly evaluate alternative powertrain control strategies and hardware configurations.

The dynamic optimization simulation facilitates investigating how different powertrain hardware configurations and control strategies influence fuel economy for different drive cycles. It will be shown that evaluating alternative hardware configurations with an optimized control strategy that exploits the fell capability of the powertrain can yield less biased evaluations compared to the state-of-the-art vehicle simulations. The backward-looking approach was selected for the reverse tractive road load model since it is well suited for fuel economy predictions and since Euler integration routines yield low run times which are necessary as additional degrees of freedom and dynamic optimization routines are added. The model's reverse approach also yields the required speeds and loads to traverse drive cycles, which can be used as design criteria for future powertrain programs, such as for the selection of optimal transmission gear ratios or minimum engine part throttle torque requirements.

Some limitations exist due to the model's backward approach. Given that the component efficiency maps are a function of input speed and load, the component inefficiencies are calculated at a one time step delay. This assumption can still produce reliable results as long as significant step changes in load do not occur. Additional assumptions regarding the mechanical and engine braking must be included due to the reverse causality of the model since throttle and brake commands must be back-calculated. When the required deceleration force achieves a specified value, a resulting mechanical braking force is assumed and once the required speed and torque reaches the engine, the amount of available engine braking can be included as feedback to the driveline components.

Since the model operates at one hertz and assumes quasi steady-state, transient effects are not represented. Also, since the simulation is mainly intended to investigate system level dynamics and overall fuel economy over a cycle, dynamic effects greater than one hertz can be ignored. Currently the model assumes standard operating temperatures of all components and does not take into account ignition or warm-up effects. Even though it is known that the efficiency of driveline and accessory components depends heavily on operating temperature, the tool concentrates on fully warm operation since the majority of driving occurs during these conditions. If desired, the tool could easily be modified to include temperature dependent data.

Shift and torque converter clutch control strategies significantly influence driver perception of ride quality and NVH but such subjective criteria are difficult to assess virtually. Initial DP results yielded too frequent up-shifting, down-shifting and torque converter clutch re-engagements. Hence a drivability constraint was added to the cost function in the form of a penalty, β, for shifting and disengaging the clutch:

$$J = \sum_{k=0}^{N-1} \dot{m}_f(k) + \beta(k)$$

Also up-shifting too early can produce a disconcerting feeling to the driver that the vehicle is underpowered or lugging. As a result a minimum engine speed after up-shift constraint was included in the DP algorithm.

Lastly, while the dynamic programming approach provides a simulated control strategy for a given drive cycle, it cannot be implemented under real driving conditions since it requires information about the future speed and load. Nonetheless, the results provide a benchmark against which other control strategies can be compared.

Initial simulation results from the reverse dynamic optimization simulation demonstrate its predictive capability and optimization potential.

The dynamic optimization simulation is not intended to predict the same results as the control strategy implemented in an actual vehicle; instead, a sequence of gear and lock-up control decisions is selected that minimizes the accumulated fuel flow over the cycle. Nevertheless, it is important that under the same gear and lock-up conditions the results correlate.

Figure 3:
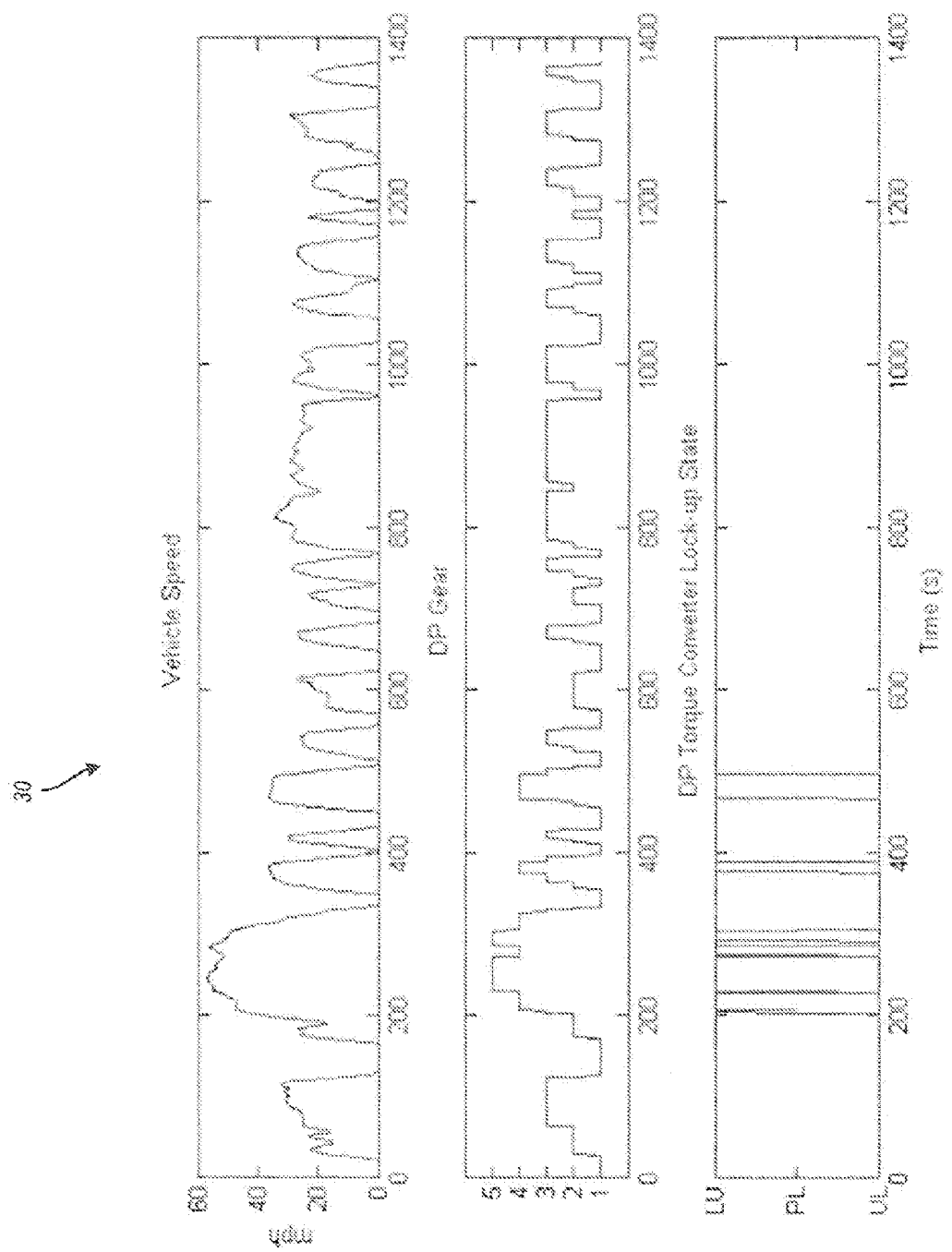
FIG. 3 is a schematic diagram illustrating the dynamic programming simulation gear and lock-up states for the FTP Urban Drive Cycle for a full-size loaded pick-up with a 5-speed automatic transmission.
Figure 4:
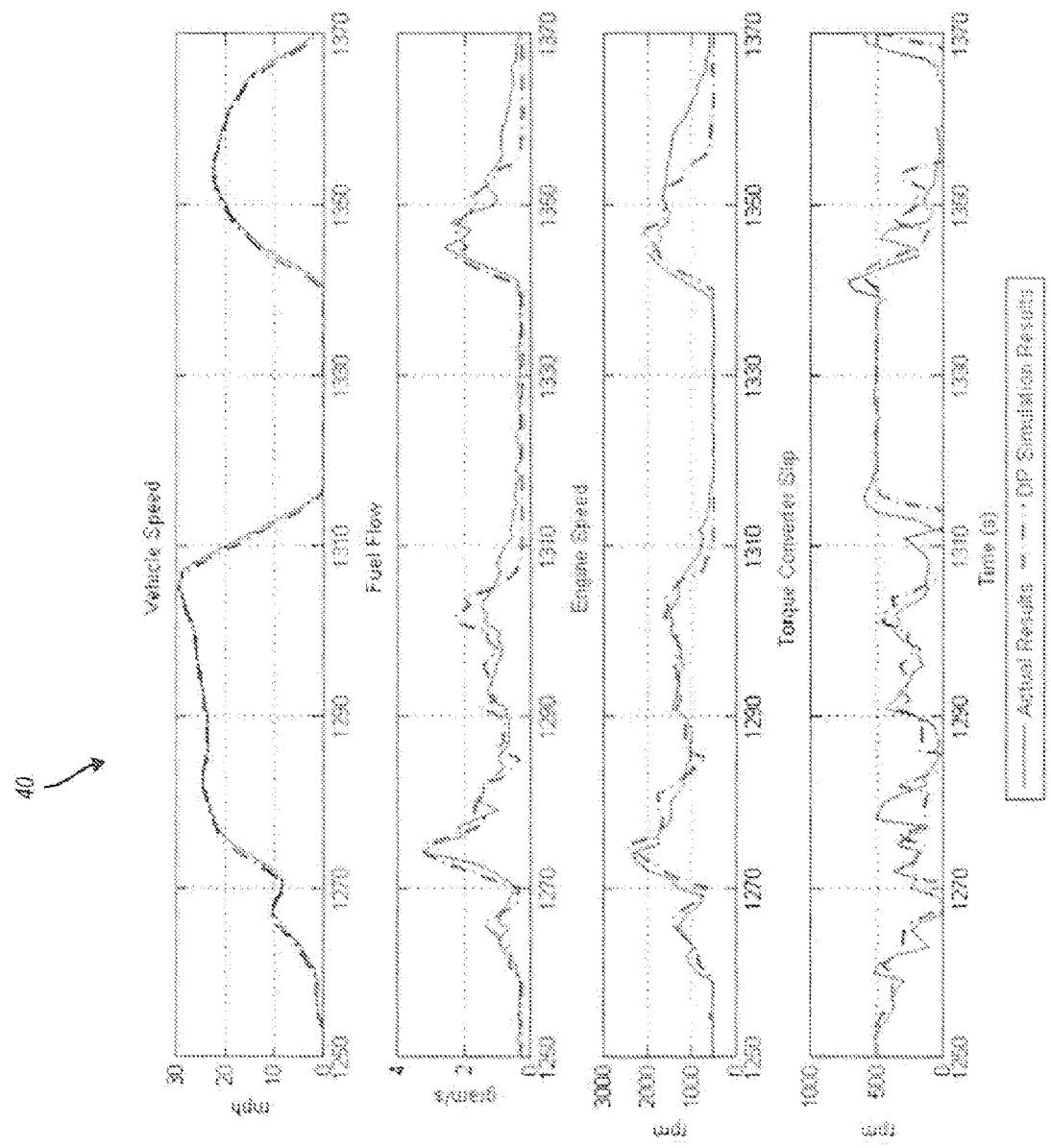
FIG. 4 is a schematic diagram illustrating the comparison of urban test measurements versus dynamic programming simulation results.
Figure 5:
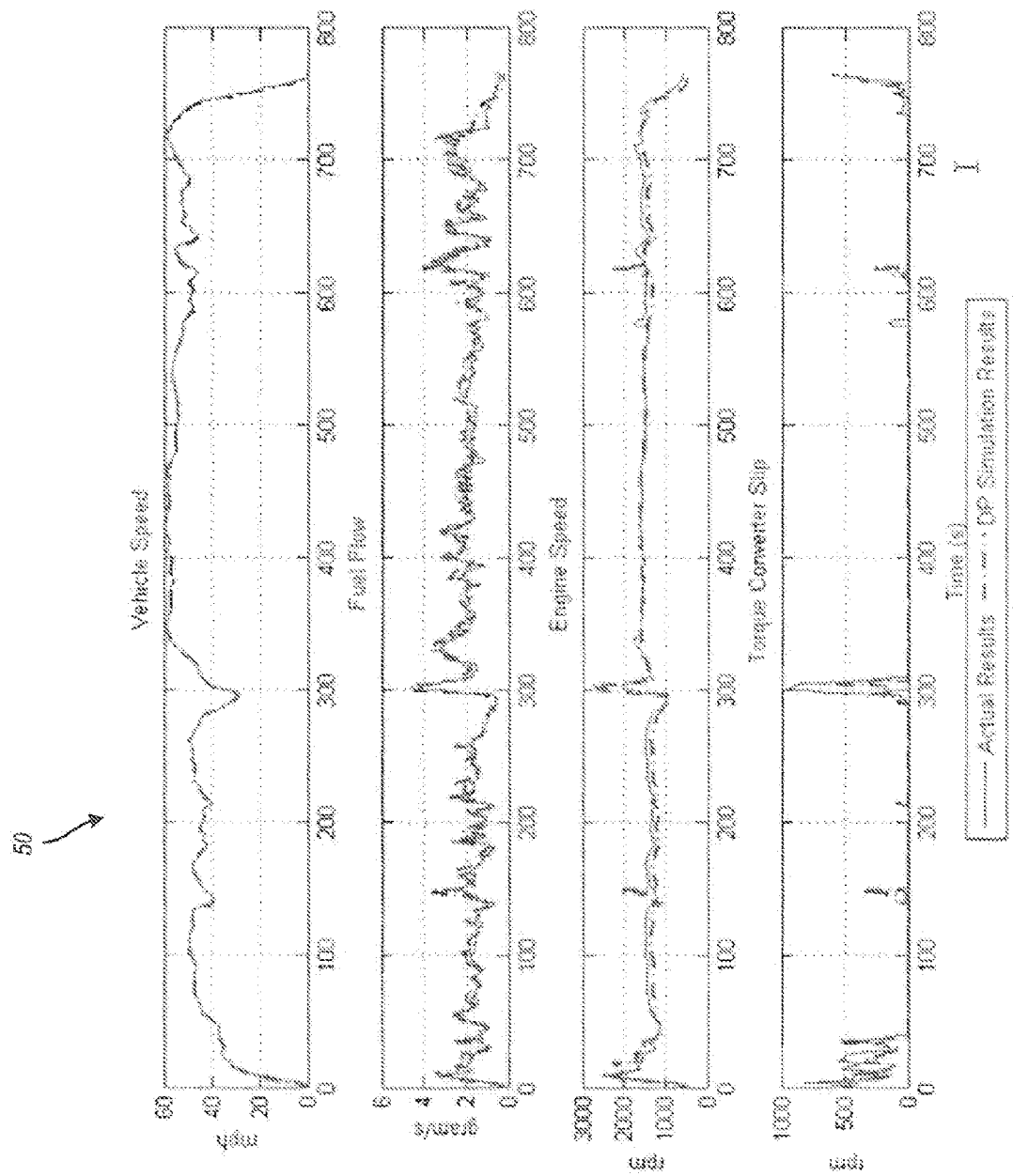
FIG. 5 is a schematic diagram illustrating the comparison of highway test measurements versus dynamic programming simulation results.

The DP simulation gear and lock-up states for the FTP Urban Drive Cycle for a full-size loaded pick-up with a 5-speed automatic transmission are shown in chart 30 in FIG. 3. A similar vehicle with the identical turbine speed constraints for $4^{th}$ and $5^{th}$ gear lock-up was tested on a chassis dynamometer using the constant volume sampling (CVS) method, the EPA's preferred method of measuring fuel economy, and the modal exhaust bench. A comparison of the simulation versus measurements for a portion of the urban cycle is shown in chart 40 in FIG. 4. Chart 50 in FIG. 5 depicts a comparison of the highway results. Table 1 compares the DP simulated fuel economy versus the measured CVS fuel economy. Some of the simulation discrepancies can be attributed to the fact that transient effects and calibrations such as deceleration fuel shut off and rolling idle speed declaration are not represented in the DP results. Basic torque converter clutch control assumptions include (1) clutch engagement transient dynamics are ignored, (2) the clutch must engage partial lock-up before engaging lull lock-up, (3) the clutch is released for all down-shifts, and (4) up-shifts and clutch engagement cannot occur simultaneously. Certain discrepancies in the torque converter slip exist since the K-factor is assumed to be solely a function of speed while in actuality the K-factor also depends on torque at low speed ratios. Also it is sometimes difficult to control to the desired slip during actual driving conditions. Even so, given that the standard deviation of chassis dynamometer fuel economy testing can be between 0.2 and 0.5 miles per gallon, the DP simulation can be a reliable means of evaluating potential fuel economy benefits.

TABLE 1

FTP Fuel Economy Results

| Drive Cycle | DP Simulation | CVS Measurement |
|---|---|---|
| Urban | 14.55 mpg | 14.29 mpg |
| Highway | 20.18 mpg | 21.17 mpg |

By determining the most efficient gear and torque converter state over various drive cycles, the dynamic optimization simulation offers significant potential in evaluating the potential fuel economy benefit of alternative powertrain control strategies. The simulation can be used to determine which conditions are better for operating in a lower gear in clutch control mode as opposed to in a higher gear in the open torque converter state. The simulation could also be used to estimate the trade-off between potential fuel economy improvements due to different clutch control strategies and the vehicle system hardware costs associated with expanding the low-speed lock-up region (e.g., higher heat capacity friction clutch material, higher quality motor mounts, turbine dampers, etc.).

Figure 6:
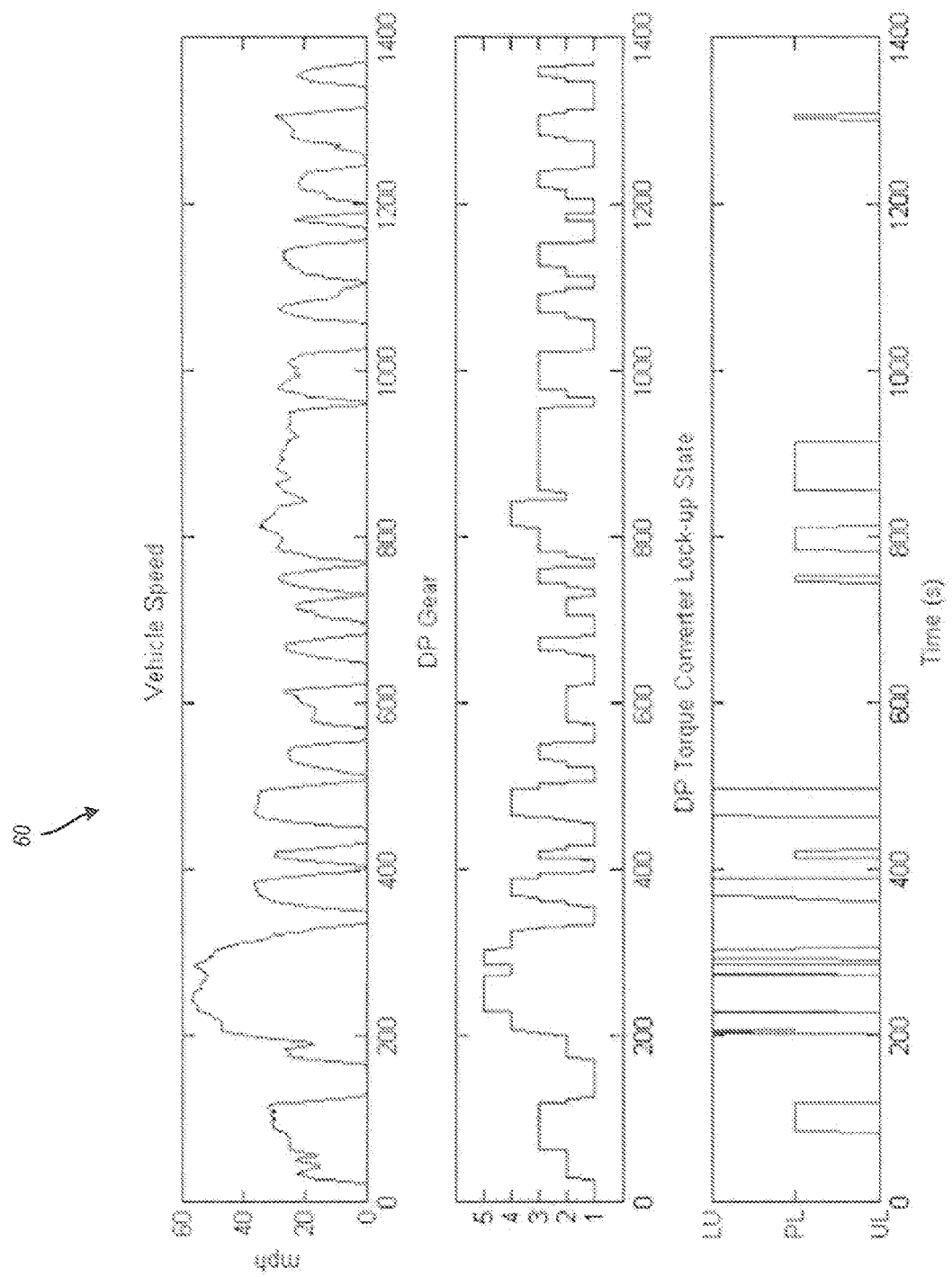
FIG. 6 is a schematic diagram illustrating dynamic programming gear and lock-up state with third gear partial lock-up.

The vehicle considered immediately above was constrained to engage in torque converter lock-up in $4^{th}$ and $5^{th}$ gear only. The simulation can be applied to predict the fuel economy benefit of expanding clutch control to include partial lock-up in $3^{rd}$ gear. The DP simulation gear and lock-up states for the same vehicle allowing for $3^{rd}$ gear partial lock-up are depicted in FIG. 6 in chart 60.

Figure 7:
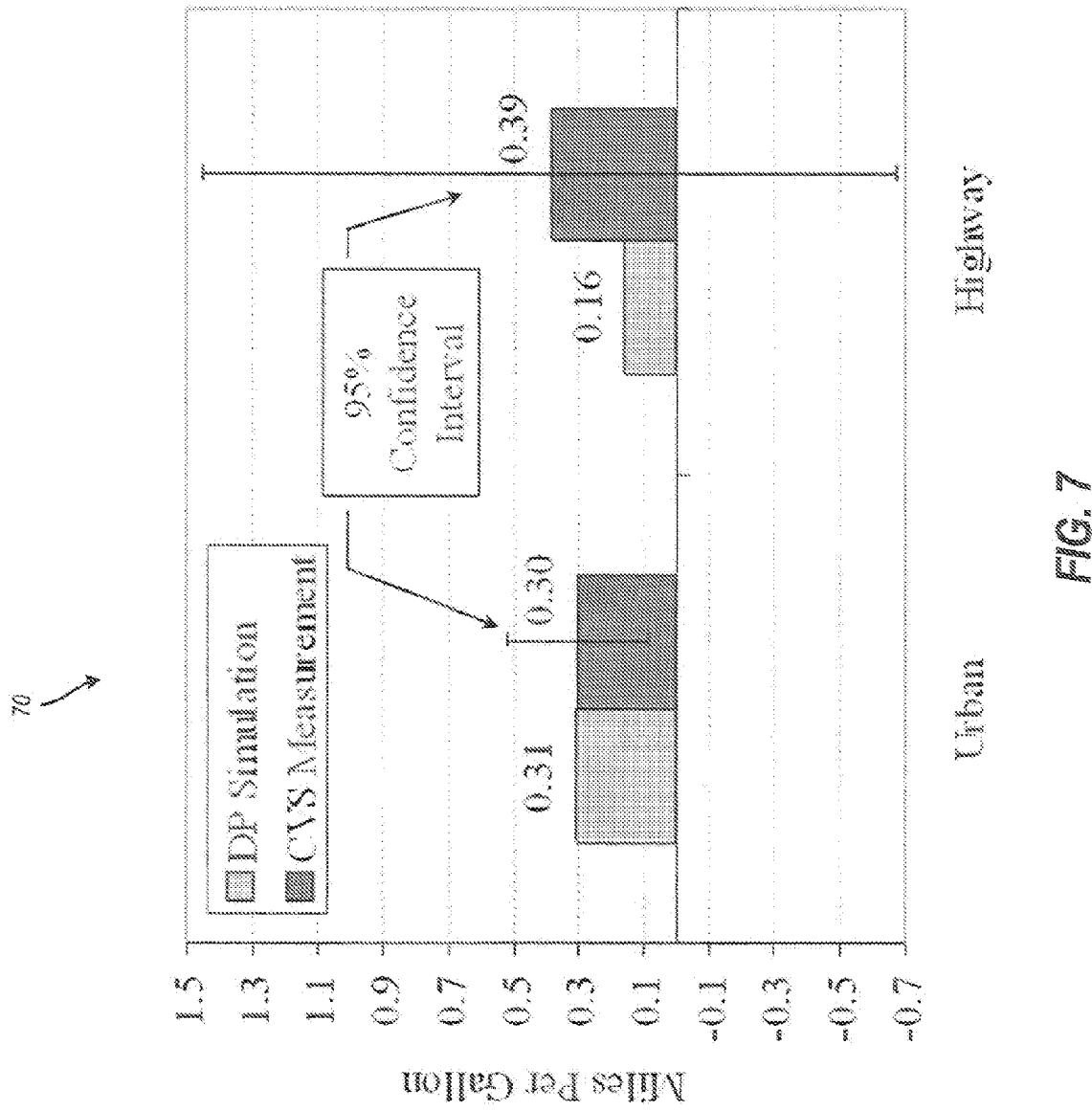
FIG. 7 is a schematic diagram illustrating the simulated versus measured fuel economy benefit of third gear partial lock-up.

To verify the results, chassis dynamometer CVS measurements were compared to the simulation results. Both configurations were tested three times each on three different days to obtain a statistical sample. A comparison of the simulation and the average measured fuel economy benefit is shown in FIG. 7 with chart 70. The mean of the difference between the measured baseline and $3^{rd}$ gear partial lock-up configurations compared to the DP simulation estimates were 0.30 and 0.31 miles per gallon, respectively. FIG. 7 chart 70 also shows the 95% confidence interval for the difference of the measured results. The measured highway results are more ambiguous due to inherent test variation. Given a chassis dynamometer test standard deviation of 0.4 miles per gallon, over 60 tests would be necessary to measure a 0.2 mile per gallon difference with 80% confidence. Since extensive testing is impractical, the reverse model and dynamic optimization methodology is a practical alternative to estimating the fuel economy benefit of alternate hardware and control strategies.

Figure 8:
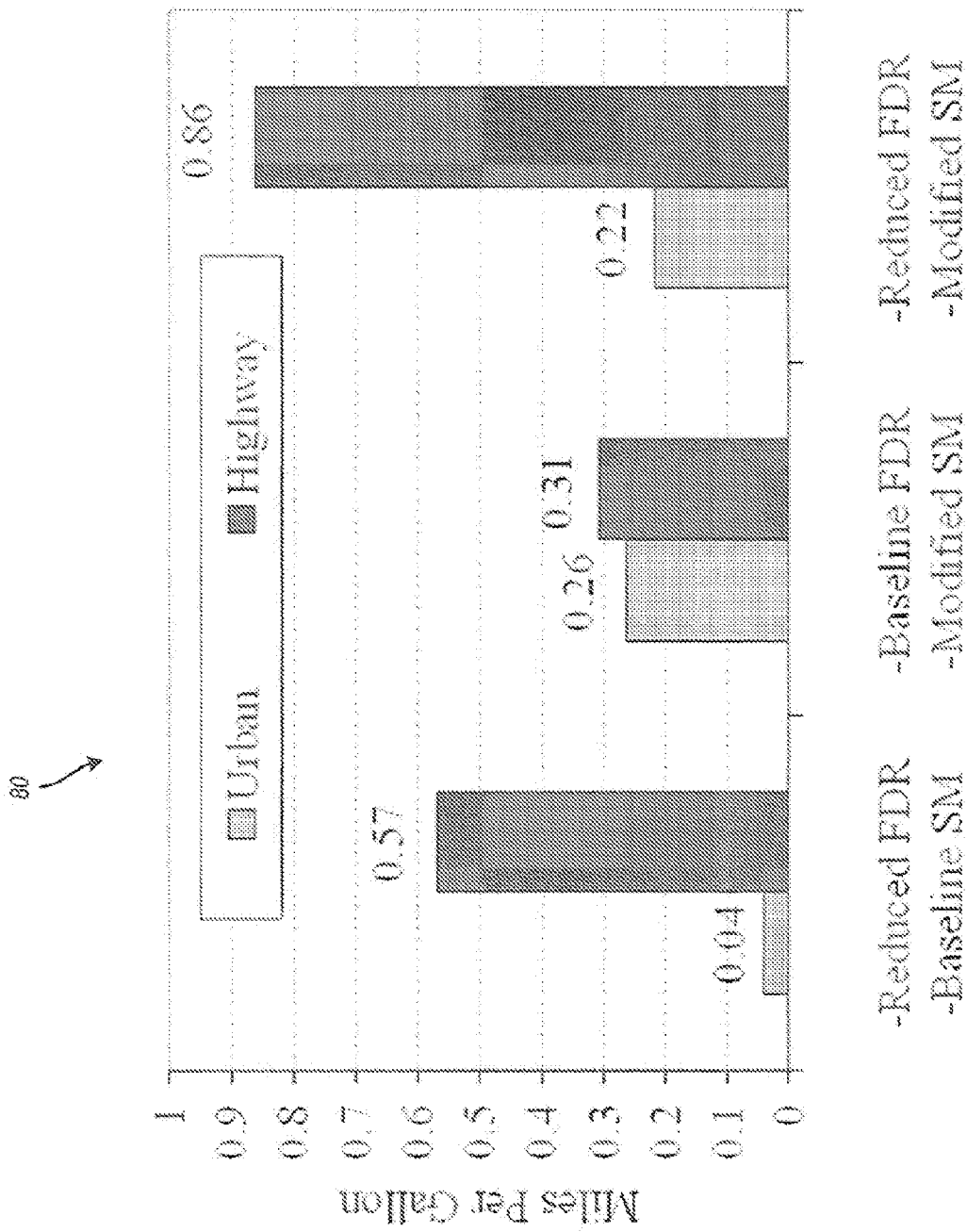
FIG. 8 is a schematic diagram illustrating the predicted FTP urban and highway fuel economy improvements for a reduction in final drive ratio (FDR) and different shift maps from a commercially available vehicle simulation package that requires the shift map (SM) as an input.

With shorter product development times, the capability of quickly evaluating potential hardware alternatives is becoming increasingly important. Since fuel economy testing requires significant hardware set-up and testing time, simulations are often relied on in the decision process. Many existing vehicle simulations require control parameters, such as the shift map, as an input. Since shift maps rarely exist for powertrain configurations that are still in the design phase, simulations are often performed on hypothetical hardware configurations with existing shift maps. FIG. 8 chart 80 depicts the predicted FTP urban and highway fuel economy improvements for a reduction in final drive ratio (FDR) and different shift maps from a commercially available vehicle simulation package that requires the shift map (SM) as an input. The modified shift map used in the simulation included earlier up-shifts and delayed down-shifts. It can be seen that using a shift map that is not optimized can lead to false conclusions since the resulting fuel economy improvement depends heavily on the shift map.

Evaluating alternative hardware configurations with an optimized control strategy that exploits the full capability of the powertrain ensures an un-biased assessment of the hardware's potential. The dynamic optimization fuel economy improvement prediction for the reduced final drive ratio is shown in Table 2.

TABLE 2

DP Simulation Fuel Economy Improvement for Reduced Final Drive Ratio

| Urban | Highway |
| --- | --- |
| −0.03 mpg | 0.26 mpg |

Figure 9:
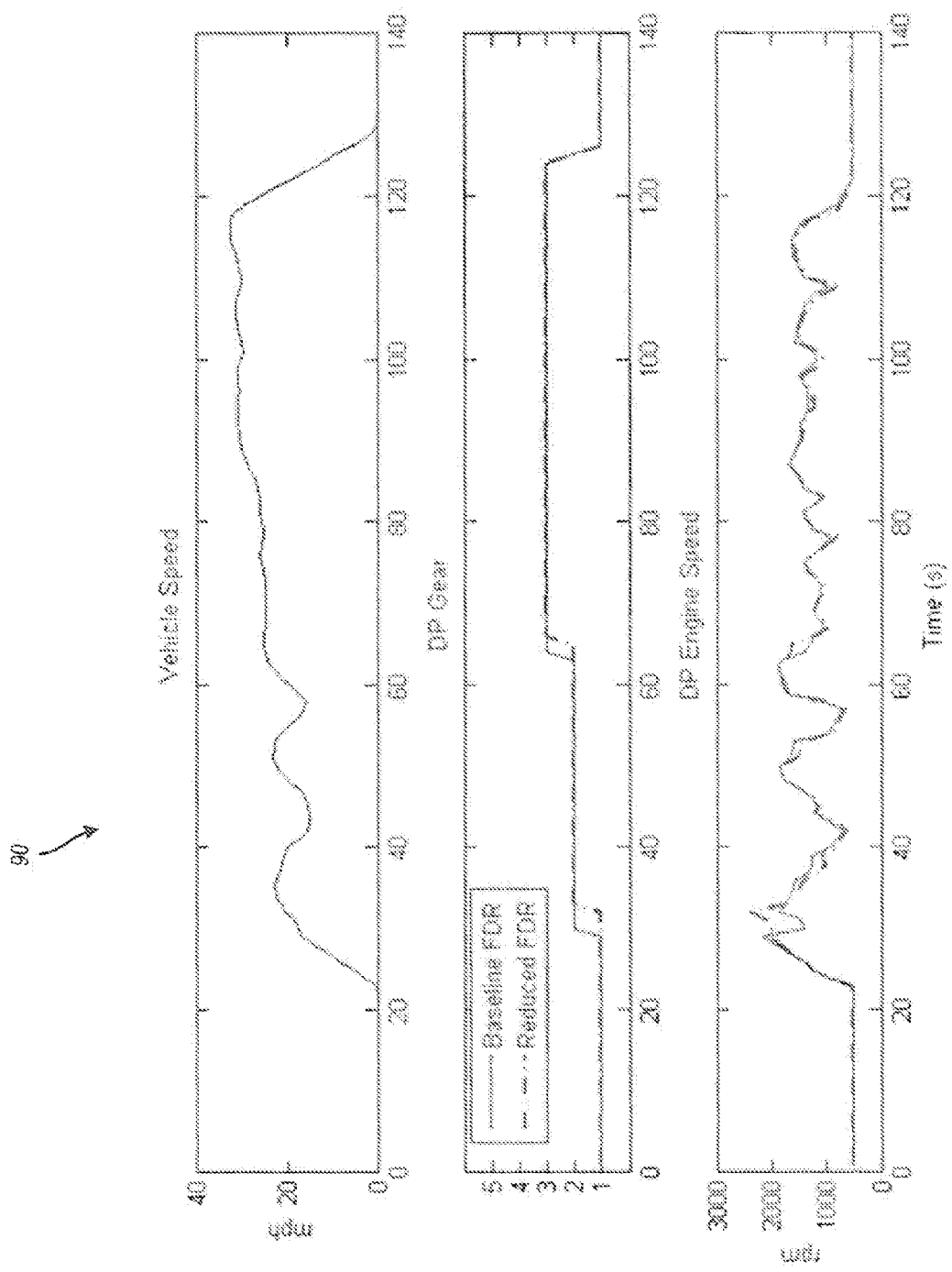
FIG. 9 is a schematic diagram illustrating a portion of the FTP Urban Drive Cycle and revealing that the numerically higher final drive ratio enables earlier up-shifts that yield far greater reductions in overall engine speed offsetting the steady-state reduction in engine speed benefit due to the reduced final drive ratio.

While the reduced final drive ratio improves fuel economy for the highway drive cycle due to the reduction in engine speed, there is a slight fuel economy penalty for the urban drive cycle. FIG. 9 chart 90 illustrates a portion of the FTP Urban Drive Cycle and reveals that the numerically higher final drive ratio enables earlier up-shifts that yield far greater reductions in overall engine speed offsetting the steady-state reduction in engine speed benefit due to the reduced final drive ratio.

The dynamic programming algorithm facilitates quick evaluation of future hardware design alternatives in the absence of existing shift and lock-up schedules that are required for the state-of-the-art vehicle simulations. Even though the actual fuel economy results may not be entirely realistic given that the dynamic programming algorithm lacks some real life constraints, the algorithm supports timely and consistent assessment of how one powertrain configuration compares to another.

Besides optimizing the powertrain configuration, the reverse tractive road load demand model can be used to establish performance criteria for the design of future new powertrain programs. Given vehicle attributes and drive cycle constraints, the simulation can be used to determine the program targets to achieve specific objectives. Since the model is backward-facing and simulates the powertrain in all possible states, the required speeds and loads to traverse the desired drive cycles can be used as design criteria.

Figure 10:
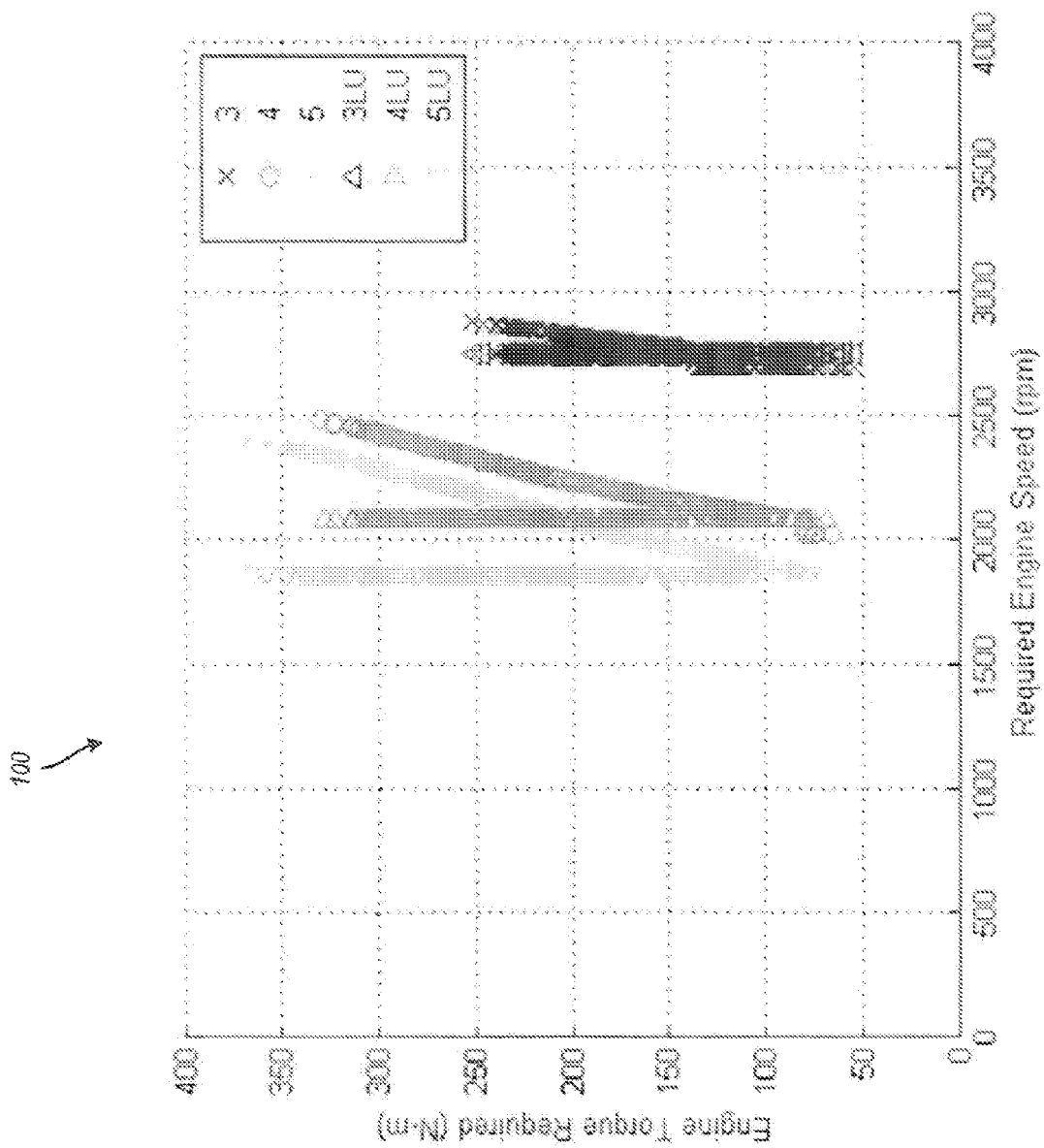
FIG. 10 is a schematic diagram illustrating the engine torque and speeds required to maintain a constant gear with +3 to −3 percent varying road grade with and without torque converter lock-up.

To illustrate how the model is used to establish design criteria, consider what engine torque would be required of a full-size pick-up truck at maximum payload cruising steady-state at 65 miles per hour with the road grade varying from +3 to −3 percent. FIG. 10 chart 100 depicts the engine torque and speeds required to maintain a constant gear with and without torque converter jock-up. The sloping effect for gears 3, 4, and 5 represents the higher engine speed required due to torque converter slip. The DP simulated fuel economy in a given gear at 65 miles per hour for a V8 engine is shown in Table 3. Table 3 clearly reveals that the ability to maintain lock-up in high gear is crucial to achieving higher fuel economy. Thus, the torque requirements to maintain lock-up in FIG. 10 chart 100 could be used as criteria for future engine designs.

The above example was selected for simplicity but other dynamic cycles such as the FTP or other customer-focused cycles could be analyzed and used to establish design requirements in a similar manner. The reverse tractive road load demand can be applied to establish design criteria for numerous other vehicle applications and driving scenarios. The advantage of this approach is that the design criteria are specifically matched to the vehicle attributes and driver applications.

TABLE 3

65 mph Steady-State Fuel Economy at Maximum Payload

| Gear State | No Grade | +3% Grade |
| --- | --- | --- |
| 3 | 14.38 mpg | 9.80 mpg |
| 4 | 14.87 mpg | 9.03 mpg |
| 5 | 14.38 mpg | 7.81 mpg |

TABLE 3-continued 65 mph Steady-State Fuel Economy at Maximum Payload

| Gear State | No Grade | +3% Grade |
| --- | --- | --- |
| 3 LU | 15.01 mpg | 10.56 mpg |
| 4 LU | 16.64 mpg | 10.99 mpg |
| 5 LU | 17.17 mpg | 11.92 mpg |

A reverse dynamic optimization methodology was developed and implemented to determine the most efficient gear and torque converter state over various drive cycles and offers significant potential in the design of more efficient vehicle systems. Some demonstrated benefits of the dynamic optimization simulation include helping to develop and evaluate shift and lock-up control strategies. By catering the shift and lock-up control strategy to the given powertrain hardware configuration, the dynamic optimization methodology facilitates rapid and consistent evaluation of hardware design alternatives. Also the reverse tractive road load demand model can be used to establish design criteria for future powertrain systems. As the demand for more fuel efficient vehicle systems increases, the dynamic optimization methodology and simulation can help to quickly assess potential vehicle system designs early on in the design process.

Figure 11:
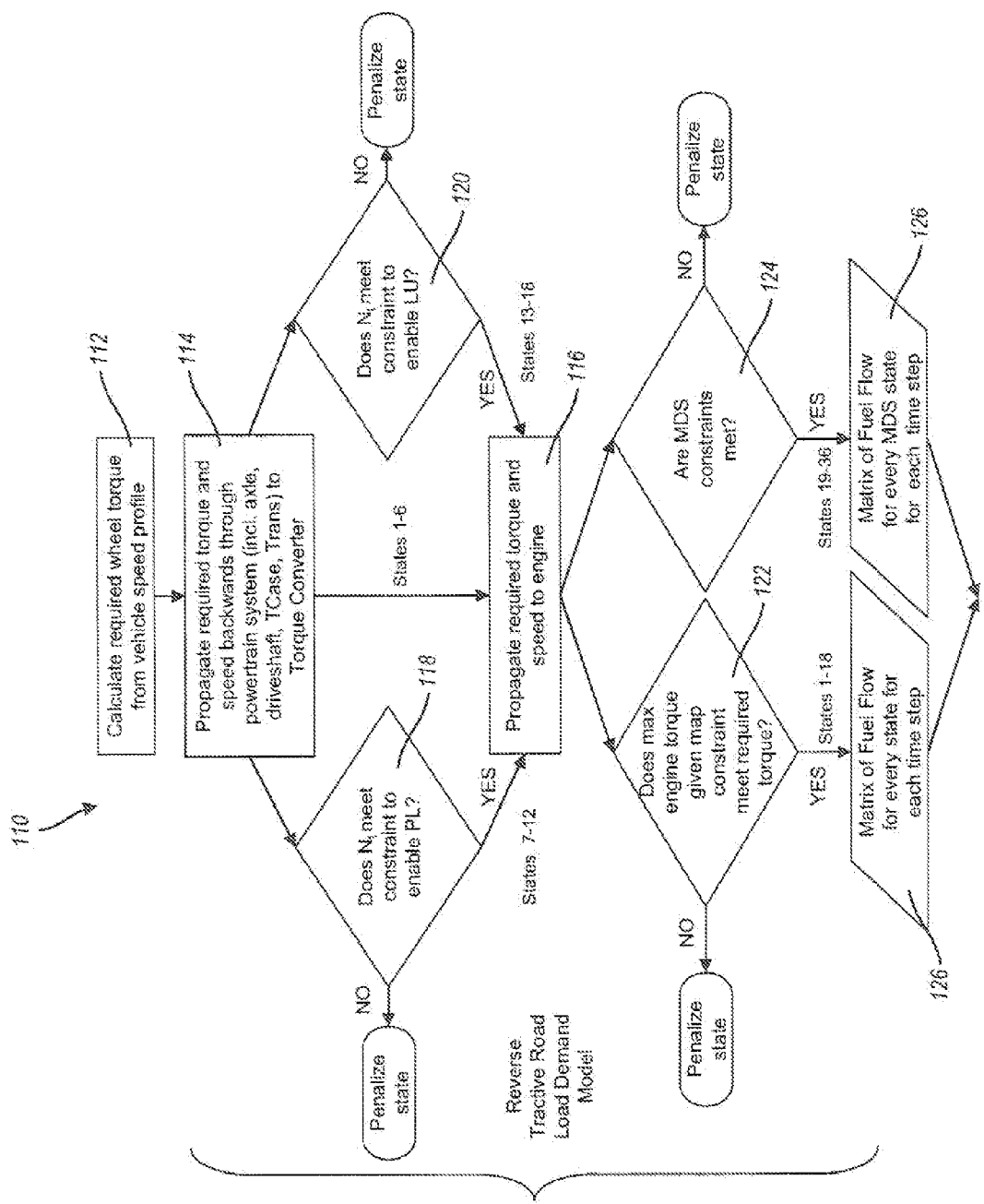
FIG. 11 is a flowchart diagram illustrating the reverse tractive road load demand simulation algorithm.

Referring now to FIG. 11, a flowchart diagram 110 illustrating the reverse tractive road load demand simulation algorithm is shown. In a preferred embodiment, the reverse tractive road load demand simulation algorithm includes calculating a required torque and speed from the vehicle speed trace 112; propagating the required torque and speed backwardly though the powertrain system to a vehicle engine 114; and propagating the required engine torque and speed to the vehicle engine 116. The reverse tractive road load demand simulation algorithm 110 includes decision points in which it is determined whether the turbine speed meets the constraints to enable partial lock-up 118, and whether the turbine speed meets the constraints to enable lock-up 120. Additionally, the reverse tractive road load demand simulation algorithm 110 includes decision points in which it is determined whether the maximum engine torque, given the map constraint, meets the required torque 122, and whether MDS constraints have been met 124. A matrix of fuel flow rates in created for each of the stored states at each time step 126.

Figure 12:
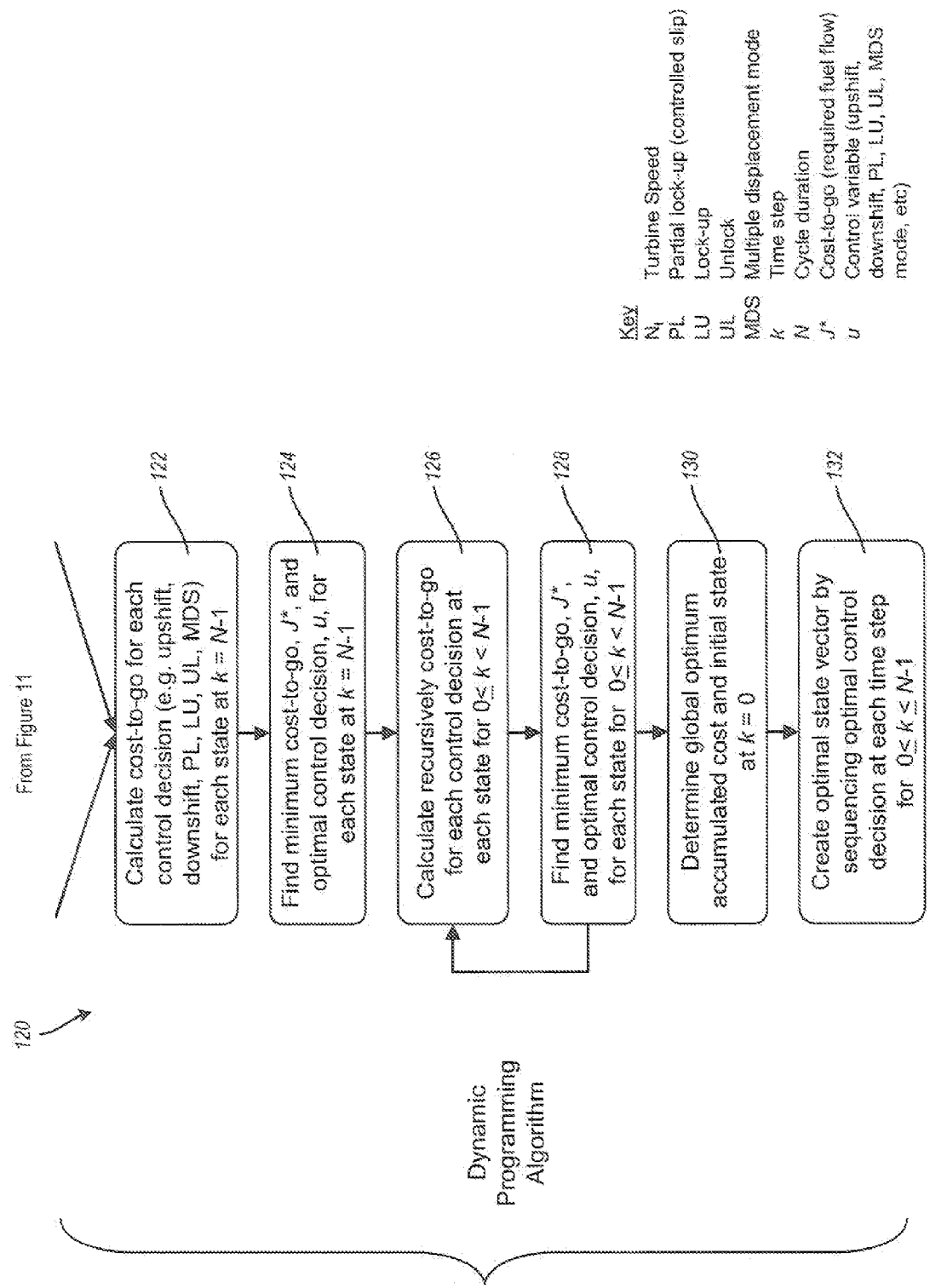
FIG. 12 is a flowchart diagram illustrating the dynamic programming algorithm.

Referring now to FIG. 12, a flowchart diagram illustrating the dynamic programming algorithm 120 is shown. The dynamic programming algorithm 120 is applied to the matrix (126 in FIG. 11) of the fuel flow rates for each of the stored states at each time step to find the optimal control path that maximizes the powertrain efficiency over the cycle. Dynamic programming is based on Bellman's Principle of Optimality and proposes that an optimal policy can be constructed in an iterative fashion by first solving the sub-problem at the last time step, N, then gradually extending the problem to include the last two time steps, and continuing until the optimal policy for the entire problem is determined. The advantage of dynamic programming is that the optimal control state at a given time step is not viewed in isolation since control decisions will be ranked against the sum of the present costs and future costs. The cost function is additive in the sense that the cost, i.e., the required fuel flow, incurred at time, k, accumulates over time:

$$J = g_N(x_N) + \sum_{k=0}^{N-1} L_k(x_k, u_k)$$

where $g_N$ is the cost at time step N, $L_k$ is the instantaneous transition cost at time step k, and the system is modeled as a discrete time non-linear system of the form:

$$x_{k+1} = f_k(x_k, u_k), k=0,1,\ldots, N-1$$

where $x_k$ defines the state of the system and $u_k$ defines the control variables to be selected at time k. The state and control variables are stored in discrete grids and the optimal global solution is determined by solving for the minimum cost recursively.

The dynamic programming algorithm 120 includes, calculating a required fuel flow for each of a plurality of control decisions for each of a plurality of powertrain states at k=N−1 122, identifying a minimum required fuel flow and an optimal control decision for each of the plurality of powertrain states at k=N−1 124, calculating recursively a required fuel flow for each of a plurality of control decisions for each of a plurality of powertrain states for 0≦k<N−1 126, identifying a minimum required fuel flow and an optimal control decision for each of a plurality of powertrain states for 0≦k<N−1 128, determining a global optimum accumulated required fuel flow and initial powertrain state at k=0 130, and creating an optimal state vector by sequencing the optimal control decision at each time step for 0≦k≦N−1 132, wherein k is a time step and N is a cycle duration.

Figure 13:
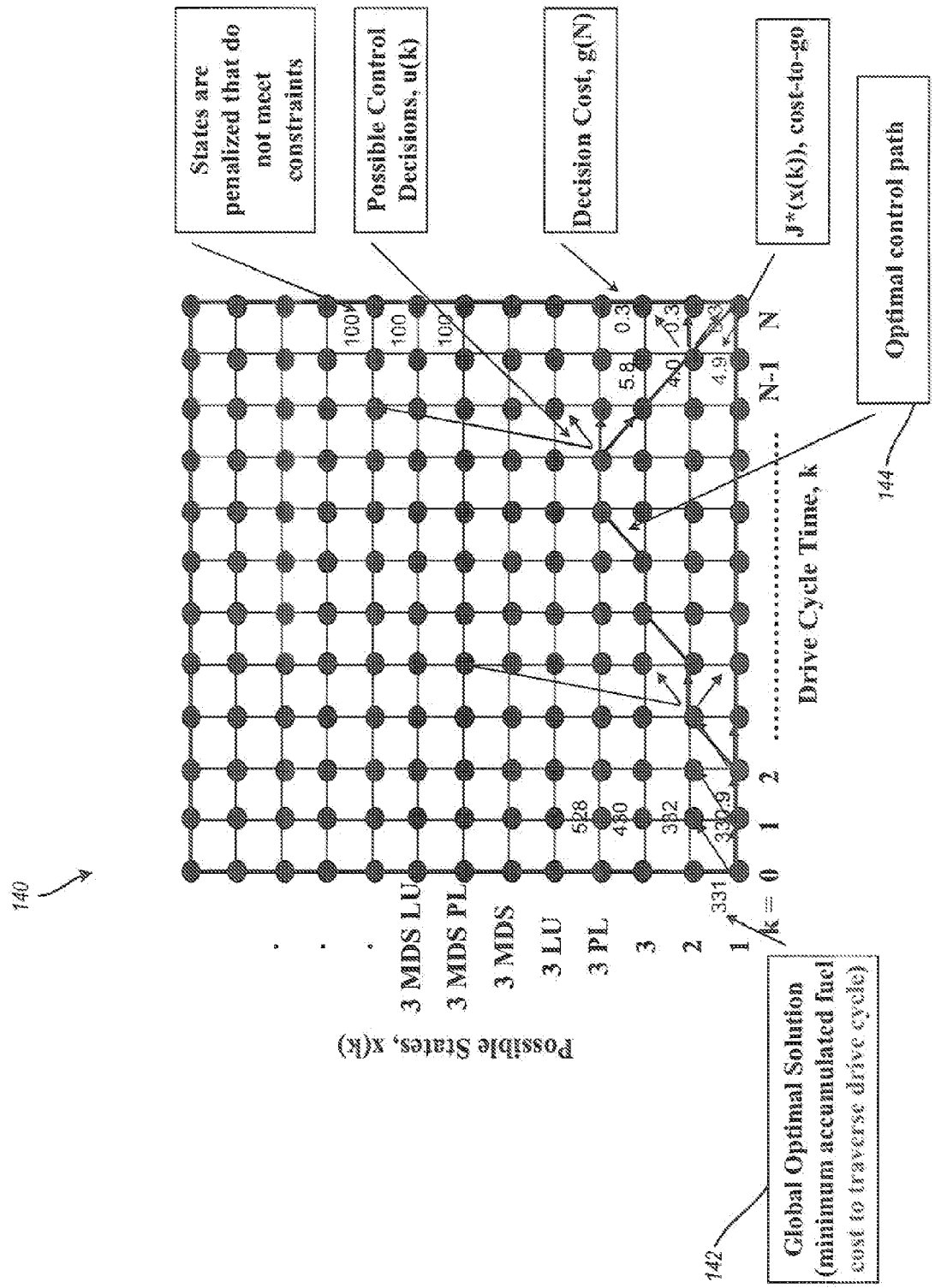
FIG. 13 is a schematic diagram illustrating the application of dynamic programming to a matrix of fuel flow rates for each of the stored states at each time step in order to find the optimal control path that maximizes the powertrain efficiency over time.

FIG. 13 is a chart diagram 140 illustrating the application of the dynamic programming algorithm to a matrix of fuel flow rates for each of the stored states at each time step in order to find the optimal control path that maximizes the powertrain efficiency over time. States that do not meet the constraints are penalized. The global optimal solution 142 and the optimal control path 144 are illustrated in chart 140.

What is claimed is:

1. A computer implemented method for powertrain optimization and improved fuel economy in a vehicle, the method comprising:
   (a) providing a modeled powertrain system and vehicle engine;
   (b) utilizing a reverse tractive road load demand simulation algorithm to propagate a reverse tractive road load demand and a corresponding component torque and speed, the corresponding component torque and speed derived from a vehicle speed trace in a reverse direction through the modeled powertrain system comprising:
   (i) calculating required torque and speed from the vehicle speed trace;
   (ii) propagating the required torque and speed backwardly through the modeled powertrain system to the modeled vehicle engine; and
   (c) determining fuel flow for each one of a plurality of states of the modeled powertrain system with the determined required engine torque and speed utilizing a dynamic optimization algorithm capable of executing a plurality of iterations to:
   (i) calculate required fuel flow for each of a plurality of powertrain component control decisions for each of a plurality of powertrain states at k=N−1
   (ii) identify a minimum required fuel flow and an optimal control decision for each of the plurality of powertrain states at k=N−1,
   (iii) calculate recursively a required fuel flow for each of a plurality of control decisions for each of a plurality of powertrain states for 0≦k<N−1,
   (iv) identify a minimum required fuel flow and an optimal control decision for each of a plurality of powertrain states for 0≦k<N−1, (v) determine a global optimum accumulated required fuel flow and initial powertrain state at k=0, and
(vi) create an optimal state vector by sequencing the optimal control decision at each time step for 0≦k≦N−1, wherein k is a time step and N is a cycle duration, and
(d) identifying an optimal state for each of the plurality of powertrain components, and
(e) controlling each of the plurality of powertrain components in the identified optimal state for each of the plurality of powertrain components in order to improve fuel efficiency.

2. The computer implemented method for powertrain optimization and improved fuel economy of claim 1, wherein the modeled powertrain system further comprises each of wheels, axle, driveshaft, transfer case, transmission, torque converter, and engine vehicle subsystems, the method further comprising:
utilizing the reverse tractive road load demand simulation algorithm with a direction of power transfer flowing from the wheel, to the axle, to the driveshaft, to the transfer case, to the transmission, to the torque converter, and to the engine vehicle subsystem.

3. The computer implemented method for powertrain optimization and improved fuel economy of claim 1, the method further comprising:
utilizing the reverse tractive road load demand simulation algorithm to simulate the required engine torque as a function of engine speed based on a plurality of vehicle attributes;
propagating the required torque and speed from the vehicle wheels through the powertrain for all possible component states;
utilizing the required engine torque to traverse different drive cycles as part throttle engine torque design requirements.

4. The computer implemented method for powertrain optimization and improved fuel economy of claim 1, the method further comprising:
utilizing the reverse tractive road load demand simulation algorithm to optimize cycle-based automotive shift and lock-up scheduling for improved fuel economy;
determining required fuel flow for all possible states within hardware constraints;
determining a cycle-based automotive shift and lock-up schedule for improved fuel economy;
applying the dynamic optimization algorithm to find an optimal control path that minimizes accumulated fuel flow; and
controlling a vehicle powertrain subsystem with the optimal control path to minimize the accumulated fuel flow.

5. The computer implemented method for powertrain optimization and improved fuel economy of claim 1, the method further comprising:
utilizing the reverse tractive road load demand simulation algorithm to optimize a multiple displacement engine over a plurality of different drive cycles;
determining if there is enough torque available in a multiple displacement mode;
utilizing the dynamic optimization algorithm to find an optimal control path yielding a minimal accumulated fuel flow and an optimal control policy; and
controlling a vehicle powertrain subsystem with the optimal control path to yield minimal accumulated fuel flow and optimal control policy.

6. The computer implemented method for powertrain optimization and improved fuel economy of claim 1, the method further comprising:
utilizing the reverse tractive road load demand simulation algorithm to determine a required fuel flow for all possible states within hardware constraints;
determining the required fuel flow for all possible states within hardware constraints;
utilizing the dynamic optimization algorithm to find an optimal control for a plurality of powertrain components; and
iteratively calculating an optimal combination of powertrain components that performs well based on a desired cycle of interest.

7. The computer implemented method for powertrain optimization and improved fuel economy of claim 1, wherein the reverse tractive road load demand simulation algorithm further comprises:
utilizing the following relationship:

$$F = A + Bv + Cv^2 + m\frac{dv}{dt} + mg\sin\theta$$

wherein A, B, and C are the road load coefficients, v is the vehicle speed, m is the vehicle mass, g is gravity, and θ is the angle the road makes with the horizontal.

8. The computer implemented method for powertrain optimization and improved fuel economy of claim 1, wherein the dynamic optimization algorithm further comprises:
utilizing the following relationship for determining a total cost to be minimized:

$$J = g_N(x_N) + \sum_{k=0}^{N-1} L_k(x_k, u_k)$$

wherein $g_N$ is the cost at time step N, $L_k$ is the instantaneous transition cost at time step k, and the system is modeled as a discrete time non-linear system of the form:

$$x_{k+1} = f_k(x_k, u_k), k=0,1,\ldots,N-1$$

wherein $x_k$ defines the state of the system and $u_k$ defines the control variables to be selected at time k.

9. A control system for powertrain optimization and improved fuel economy in a vehicle, the control system comprising:
a modeled powertrain system;
a reverse tractive road load demand simulation algorithm, in operative communication with the modeled powertrain system, operative to propagate a reverse tractive road load demand and a corresponding component torque and speed, the corresponding component torque and speed derived from a vehicle speed trace, in a reverse direction through the modeled powertrain system;
wherein the control system comprises logic configured to,
calculate a required torque and speed from the vehicle speed trace,
propagate the required torque and speed backwardly through the modeled powertrain system to a vehicle engine,
control the vehicle engine and improving the fuel economy with the determined required engine torque and speed by (a) utilizing a dynamic optimization algorithm to (i) calculate required fuel flow for each of a plurality of powertrain component control decisions for each of a plurality of powertrain states at k=N−1, wherein k is a time step and N is a cycle duration, (ii) identify a minimum required fuel flow and an optimal control decision for each of the plurality of powertrain states at k=N−1, (iii) calculate recursively a required fuel flow for each of a plurality of control decisions for each of a plurality of powertrain states for 0≦k<N−1, (iv) identify a minimum required fuel flow and an optimal control decision for each of a plurality of powertrain states for 0≦k<N−1, (v) determine a global optimum accumulated required fuel flow and initial powertrain state at k=0, and (vi) create an optimal state vector by sequencing the optimal control decision at each time step for 0≦k≦N−1, and (b) identifying an optimal state for each of the plurality of powertrain components, and (c) controlling each of the plurality of powertrain components in the identified optimal state for each of the plurality of powertrain components in order to improve fuel efficiency.

10. The control system for powertrain optimization and improved fuel economy of claim 9, wherein the modeled powertrain system further comprises each of wheels, axle, driveshaft, transfer case, transmission, torque converter, and engine vehicle subsystems, the control system further comprising:
logic configured to utilize the reverse tractive road load demand simulation algorithm with a direction of power transfer flowing from the wheel, to the axle, to the driveshaft, to the transfer case, to the transmission, to the torque converter, and to the engine vehicle subsystem.

11. The control system for powertrain optimization and improved fuel economy of claim 9, the control system further comprising:
logic configured to:
utilize the reverse tractive road load demand simulation algorithm to simulate the required engine torque as a function of engine speed based on a plurality of vehicle attributes;
propagate the required torque and speed from the vehicle wheels through the powertrain for all possible component states; and
utilize the required engine torque to traverse different drive cycles as part throttle engine torque design requirements.

12. The control system for powertrain optimization and improved fuel economy of claim 9, the control system further comprising:
logic configured to:
utilize the reverse tractive road load demand simulation algorithm to optimize cycle-based automotive shift and lock-up scheduling for improved fuel economy,
determine required fuel flow for all possible states within hardware constraints,
determine a cycle-based automotive shift and lock-up schedule for improved fuel economy,
apply the dynamic optimization algorithm to find an optimal control path that minimizes accumulated fuel flow, and
control a vehicle powertrain subsystem with the optimal control path to minimize the accumulated fuel flow.

13. The control system for powertrain optimization and improved fuel economy of claim 9, the control system further comprising:
logic configured to:
utilize the reverse tractive road load demand simulation algorithm to optimize a multiple displacement engine over a plurality of different drive cycles,
determine if there is enough torque available in a multiple displacement mode,
utilize the dynamic optimization algorithm to find an optimal control path yielding a minimal accumulated fuel flow and an optimal control policy, and
control a vehicle powertrain subsystem with the optimal control path to yield minimal accumulated fuel flow and optimal control policy.

14. The control system for powertrain optimization and improved fuel economy of claim 9, the control system further comprising:
logic configured to:
utilize the reverse tractive road load demand simulation algorithm to determine a required fuel flow for all possible states within hardware constraints,
determine the required fuel flow for all possible states within hardware constraints,
utilize the dynamic optimization algorithm to find an optimal control for a plurality of powertrain components, and
iteratively calculate an optimal combination of powertrain components that performs well based on a desired cycle of interest.

15. The control system for powertrain optimization and improved fuel economy of claim 9, wherein the reverse tractive road load demand simulation algorithm further comprises:
logic configured to utilizing the following relationship:

$$F = A + Bv + Cv^2 + m\frac{dv}{dt} + mg\sin\theta$$

wherein A, B, and C are the road load coefficients, v is the vehicle speed, m is the vehicle mass, g is gravity, and θ is the angle the road makes with the horizontal.

16. The control system for powertrain optimization and improved fuel economy of claim 9, wherein the dynamic optimization algorithm further comprises:
logic configured to:
utilize the following relationship for determining a total cost to be minimized:

$$J = g_N(x_N) + \sum_{k=0}^{N-1} L_k(x_k, u_k)$$

wherein $g_N$ is the cost at time step N, $L_k$ is the instantaneous transition cost at time step k, and the system is modeled as a discrete time non-linear system of the form:

$$x_{k+1} = f_k(x_k, u_k), k=0,1,\ldots,N-1$$

wherein $x_k$ defines the state of the system and $u_k$ defines the control variables to be selected at time k.

17. A computer readable medium encoded with programming for powertrain optimization and improved fuel economy in a vehicle, the programming configured to:
utilize a reverse tractive road load demand simulation algorithm,
propagate a reverse tractive road load demand and a corresponding component torque and speed, the corresponding component torque and speed derived from a vehicle speed trace, in a reverse direction through a modeled powertrain system,
calculate a required torque and speed from the vehicle speed trace,
propagate the required torque and speed backwardly through the modeled powertrain system to a vehicle engine, and
control the vehicle engine and improving the fuel economy with the determined required engine torque and speed utilizing the following relationship for determining a total cost to be minimized:

$$J = g_N(x_N) + \sum_{k=0}^{N-1} L_k(x_k, u_k)$$

wherein $g_N$ is the cost at time step N, $L_k$ is the instantaneous transition cost at time step k, and the system is modeled as a discrete time non-linear system of the form:

$$x_{k+1} = f_k(x_k, u_k), k=0,1,\ldots,N-1$$

wherein $x_k$ defines the state of the system and $u_k$ defines the control variables to be selected at time k.

18. The computer readable medium encoded with programming for powertrain optimization and improved fuel economy in a vehicle of claim 17, wherein the modeled powertrain system further comprises each of wheels, axle, driveshaft, transfer case, transmission, torque converter, and engine vehicle subsystems, the programming configured to:
utilize the reverse tractive road load demand simulation algorithm with a direction of power transfer flowing from the wheel, to the axle, to the driveshaft, to the transfer case, to the transmission, to the torque converter, and to the engine vehicle subsystem.

19. The computer readable medium encoded with programming for powertrain optimization and improved fuel economy in a vehicle of claim 17, the programming configured to:
utilize the reverse tractive road load demand simulation algorithm to simulate the required engine torque as a function of engine speed based on a plurality of vehicle attributes;
propagate the required torque and speed from the vehicle wheels through the powertrain for all possible component states; and
utilize the required engine torque to traverse different drive cycles as part throttle engine torque design requirements.

20. The computer readable medium encoded with programming for powertrain optimization and improved fuel economy in a vehicle of claim 17, the programming configured to:
utilize a dynamic optimization algorithm to calculate required fuel flow for each of a plurality of powertrain component control decisions,
identify an optimal state for each of the plurality of powertrain components, and
control each of the plurality of powertrain components in the identified optimal state for each in order to improve fuel efficiency.

21. The computer readable medium encoded with programming for powertrain optimization and improved fuel economy in a vehicle of claim 20, the programming configured to:
calculate a required fuel flow for each of a plurality of control decisions for each of a plurality of powertrain states at k=N−1,
identify a minimum required fuel flow and an optimal control decision for each of the plurality of powertrain states at k=N−1,
calculate recursively a required fuel flow for each of a plurality of control decisions for each of a plurality of powertrain states for 0≦k<N−1,
identify a minimum required fuel flow and an optimal control decision for each of a plurality of powertrain states for 0≦k<N−1,
determine a global optimum accumulated required fuel flow and initial powertrain state at k=0, and
create an optimal state vector by sequencing the optimal control decision at each time step for 0≦k≦N−1, wherein k is a time step and N is a cycle duration.

22. The computer readable medium encoded with programming for powertrain optimization and improved fuel economy in a vehicle of claim 20, the programming configured to:
utilize the reverse tractive road load demand simulation algorithm to optimize cycle-based automotive shift and lock-up scheduling for improved fuel economy,
determine required fuel flow for all possible states within hardware constraints,
determine a cycle-based automotive shift and lock-up schedule for improved fuel economy,
apply the dynamic optimization algorithm to find an optimal control path that minimizes accumulated fuel flow, and
control a vehicle powertrain subsystem with the optimal control path to minimize the accumulated fuel flow.

23. The computer readable medium encoded with programming for powertrain optimization and improved fuel economy in a vehicle of claim 20, the programming configured to:
utilize the reverse tractive road load demand simulation algorithm to determine a required fuel flow for all possible states within hardware constraints,
determine the required fuel flow for all possible states within hardware constraints,
utilize the dynamic optimization algorithm to find an optimal control for a plurality of powertrain components, and
iteratively calculate an optimal combination of powertrain components that performs well based on a desired cycle of interest.

24. The computer readable medium encoded with programming for powertrain optimization and improved fuel economy in a vehicle of claim 17, the programming configured to:
utilize the reverse tractive road load demand simulation algorithm to optimize a multiple displacement engine over a plurality of different drive cycles,
determine if there is enough torque available in a multiple displacement mode,
utilize the dynamic optimization algorithm to find an optimal control path yielding a minimal accumulated fuel flow and an optimal control policy, and
control a vehicle powertrain subsystem with the optimal control path to yield minimal accumulated fuel flow and optimal control policy.

25. The computer readable medium encoded with programming for powertrain optimization and improved fuel economy in a vehicle of claim 17, the programming configured to:
utilize the following relationship:

$$F = A + Bv + Cv^2 + m\frac{dv}{dt} + mg\sin\theta$$

wherein A, B, and C are the road load coefficients, v is the vehicle speed, m is the vehicle mass, g is gravity, and θ is the angle the road makes with the horizontal.

* * * * *